US006974038B2

(12) United States Patent  
Caplan et al.

(10) Patent No.: US 6,974,038 B2
(45) Date of Patent: *Dec. 13, 2005

(54) MODULAR RACK FOR COMPACT DISKS

(75) Inventors: David Caplan, Phoenix, AZ (US); Charles E. Taylor, Punta Gorda, FL (US)

(73) Assignee: The Sharper Image Corporation, San Francisco, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 10/867,363

(22) Filed: Jun. 14, 2004

(65) Prior Publication Data

US 2004/0222112 A1 Nov. 11, 2004

Related U.S. Application Data

(60) Division of application No. 09/625,228, filed on Jul. 24, 2000, now Pat. No. 6,786,388, which is a continuation-in-part of application No. 09/240,308, filed on Jan. 29, 1999, now abandoned.

(51) Int. Cl.[7] ................................................. A47F 5/00
(52) U.S. Cl. ........................ 211/40; 211/1.57; 211/121
(58) Field of Search .......................... 211/1.57, 40, 121; 211/163; 206/308.1; 312/134, 268

(56) References Cited

U.S. PATENT DOCUMENTS

| 553,109 | A | 1/1896 | Davison |
|---|---|---|---|
| 579,076 | A | 3/1897 | Placier et al. |
| 718,752 | A | 1/1903 | Findley |
| 887,282 | A | 5/1908 | Smith |
| 887,828 | A | 5/1908 | Mill |
| 1,008,823 | A | 11/1911 | Hill |
| 1,013,015 | A | 12/1911 | Herman |
| 1,995,273 | A | 4/1933 | Dohrwardt |
| 2,819,801 | A | 1/1958 | Winkler |
| 2,869,708 | A | 1/1959 | Nesseth |
| 2,912,118 | A | 11/1959 | Behrens et al. |
| 2,969,867 | A | 1/1961 | McClelland |
| 3,141,123 | A | 7/1964 | Olson |
| RE25,919 | E | 11/1965 | Anders |
| 3,428,384 | A | 2/1969 | Goldammer |
| 3,720,451 | A | 3/1973 | Anders |
| 3,722,743 | A | 3/1973 | Atchley |
| 3,738,178 | A | 6/1973 | Marquis |

(Continued)

FOREIGN PATENT DOCUMENTS

| DE | 9206594 | 7/1992 |
|---|---|---|
| DE | 9313107 | 11/1993 |
| DE | 9408242 | 8/1994 |
| DE | 9412562 | 10/1994 |
| DE | 19509911 A1 | 9/1995 |
| DE | 19602585 A1 | 7/1997 |

OTHER PUBLICATIONS

U.S. Appl. No. 10/881,163, filed Jun. 30, 2004, Charles E. Taylor.

(Continued)

Primary Examiner—Robert W. Gibson, Jr.
(74) Attorney, Agent, or Firm—Bell, Boyd & Lloyd LLC

(57) ABSTRACT

A high capacity motorized rack holds a plurality of jewel case enclosed CDs in holders flexibly inter-connectable with each other to form a rotatable continuous loop. The loop is rotatably retained within a vertical rack housing and is driven by a motor, disposed within the housing, under user control such that the loop is rotated until a desired CD is moved to the top region of the belt. A rack may hold two or more such loops of inter-connected holders. In one embodiment a holder retains a single jewel case, and comprises two independent loops that are rotated with a single motor. A lamp and/or barcode scanner may be disposed on the housing for ease of CD selection. The housing base preferably is detached during shipping to permit transporting the rack in a smaller volume container. User control can include voice commands to direct loop rotation and speed.

16 Claims, 17 Drawing Sheets

U.S. PATENT DOCUMENTS

| | | |
|---|---|---|
| 3,786,927 A | 1/1974 | Manheim |
| 3,800,902 A | 4/1974 | Keller |
| 3,843,873 A | 10/1974 | Beville |
| 3,937,316 A | 2/1976 | Gerhardt |
| 3,984,700 A | 10/1976 | Sheridan |
| 4,026,617 A | 5/1977 | Bosio et al. |
| 4,039,288 A | 8/1977 | Moran |
| 4,084,691 A | 4/1978 | Leedom |
| 4,097,704 A | 6/1978 | Piber |
| 4,275,762 A | 6/1981 | Field |
| 4,320,267 A | 3/1982 | Greve |
| 4,428,005 A | 1/1984 | Kubo |
| 4,630,949 A | 12/1986 | Boella |
| 4,717,364 A | 1/1988 | Furukawa |
| 4,844,260 A | 7/1989 | Jaw |
| 4,884,691 A | 12/1989 | Behrens et al. |
| 4,940,142 A | 7/1990 | Behrens et al. |
| 4,972,503 A | 11/1990 | Zurlinden |
| 5,042,619 A | 8/1991 | Kohno |
| 5,103,986 A | 4/1992 | Marlowe |
| 5,143,193 A | 9/1992 | Geraci |
| 5,147,034 A | 9/1992 | Broadhead |
| 5,154,301 A | 10/1992 | Kos |
| 5,160,050 A | 11/1992 | Russo |
| 5,176,250 A | 1/1993 | Cheng |
| 5,180,058 A | 1/1993 | Hu |
| 5,187,630 A | 2/1993 | MacKay |
| 5,188,228 A | 2/1993 | Barrett |
| 5,201,414 A | 4/1993 | Kaszubinski |
| 5,209,086 A | 5/1993 | Bruhwiler |
| 5,226,782 A | 7/1993 | Rigling |
| 5,242,060 A | 9/1993 | Chiang et al. |
| 5,255,773 A | 10/1993 | Pollock |
| 5,283,603 A | 2/1994 | Kronbauer et al. |
| 5,290,118 A | 3/1994 | Ozeki |
| 5,293,992 A | 3/1994 | Warner |
| 5,314,242 A | 5/1994 | Ludlow |
| 5,322,162 A | 6/1994 | Melk |
| 5,341,258 A | 8/1994 | Chalmers et al. |
| 5,349,331 A | 9/1994 | Sieber et al. |
| 5,350,564 A | 9/1994 | Mazza |
| 5,351,161 A | 9/1994 | MacKay |
| 5,366,073 A | 11/1994 | Turrentine |
| D353,322 S | 12/1994 | Oshry et al. |
| 5,383,554 A | 1/1995 | Cowan |
| D356,699 S | 3/1995 | Lee |
| 5,396,987 A | 3/1995 | Temple |
| 5,464,091 A | 11/1995 | Callahan et al. |
| 5,474,170 A | 12/1995 | Erickson |
| 5,513,749 A | 5/1996 | Simmons |
| 5,518,112 A | 5/1996 | Ono et al. |
| 5,520,279 A | 5/1996 | Lin |
| 5,573,120 A | 11/1996 | Kaufman |
| 5,584,398 A | 12/1996 | Lin |
| 5,590,767 A | 1/1997 | Li |
| 5,593,031 A | 1/1997 | Uchida |
| 5,593,032 A | 1/1997 | Staley |
| 5,593,269 A | 1/1997 | Bernard |
| 5,600,430 A | 2/1997 | Folkins |
| 5,651,202 A | 7/1997 | Hewitt |
| 5,672,512 A | 9/1997 | Shaw |
| 5,695,053 A | 12/1997 | Koh |
| 5,695,054 A | 12/1997 | Weisburn |
| 5,697,498 A | 12/1997 | Weisburn |
| 5,699,905 A | 12/1997 | Hara |
| 5,703,774 A | 12/1997 | Houck |
| 5,704,474 A | 1/1998 | Oland |
| 5,705,997 A | 1/1998 | Park |
| 5,711,431 A | 1/1998 | Reichert |
| 5,715,937 A | 2/1998 | Oshry |
| 5,715,948 A | 2/1998 | Hung |
| 5,727,681 A | 3/1998 | Li |
| 5,730,283 A | 3/1998 | Lax |
| 5,744,788 A | 4/1998 | Metlitsky |
| 5,762,187 A | 6/1998 | Belden |
| 5,765,695 A | 6/1998 | Picciallo |
| 5,775,491 A | 7/1998 | Taniyama |
| 5,789,730 A | 8/1998 | Rockstein |
| 5,813,525 A | 9/1998 | McQueeny |
| 5,823,332 A | 10/1998 | Clausen |
| 5,833,062 A | 11/1998 | Yeh |
| 5,839,576 A | 11/1998 | Kim |
| 5,844,593 A | 12/1998 | Proffitt |
| 5,845,790 A | 12/1998 | Smith |
| 5,848,688 A | 12/1998 | Paloheimo |
| 5,881,872 A | 3/1999 | Frick |
| 5,882,052 A | 3/1999 | Whitehead |
| 5,894,941 A | 4/1999 | Woodruff |
| 5,901,949 A | 5/1999 | Muranaka |
| 5,906,275 A | 5/1999 | Jokic |
| 5,915,549 A | 6/1999 | Palmer |
| 5,964,356 A | 10/1999 | Gareau |
| 6,182,825 B1 | 2/2001 | Butcher |
| 6,202,861 B1 | 3/2001 | Mah |
| 6,215,264 B1 | 4/2001 | Ma |
| 6,276,523 B2 | 8/2001 | Sanders |
| 6,430,976 B1 | 8/2002 | Mitsuyama |
| 6,464,088 B1 | 10/2002 | Caplan |
| 6,520,347 B2 | 2/2003 | Caplan |
| 6,523,700 B2 | 2/2003 | Nadeau |
| 6,561,346 B1 | 5/2003 | Lew et al. |
| 6,598,752 B1 | 7/2003 | Davidov |
| 6,606,280 B1 | 8/2003 | Knittel |
| 6,786,338 B1 | 9/2004 | Caplan |
| 2002/0190012 A1 | 12/2002 | Taylor |
| 2002/0190013 A1 | 12/2002 | Caplan et al. |
| 2002/0190014 A1 | 12/2002 | Taylor |
| 2003/0042216 A1 | 3/2003 | Taylor et al. |
| 2003/0047525 A1 | 3/2003 | Taylor et al. |
| 2003/0047526 A1 | 3/2003 | Taylor et al. |
| 2003/0226813 A1 | 12/2003 | Taylor et al. |
| 2003/0226814 A1 | 12/2003 | Taylor et al. |

OTHER PUBLICATIONS

U.S. Appl. No. 10/881,149, filed Jun. 30, 2004, Charles E. Taylor.

U.S. Appl. No. 10/872,916, filed Sep. 7, 2004, Charles E. Taylor.

U.S. Appl. No. 10/943,678, filed Sep. 1, 2004, David Caplan.

U.S. Appl. No. 10/881,860, filed Jun. 30, 2004, Charles E. Taylor.

U.S. Appl. No. 10/878,182, filed Jun. 28, 2004, Charles E. Taylor.

MODULAR RACK FOR COMPACT DISKS

CROSS REFERENCES TO RELATED APPLICATION

This application is a Divisional of application Ser. No. 09/625,228 filed Jul. 24, 2000 now U.S. Pat. No. 6,786,338 entitled "Modular Rack for Compact Disks" which is a continuation in part of application Ser. No. 09/240,308 filed Jan. 29, 1999, entitled "Rack for Compact Disks", now abandoned.

FIELD OF THE INVENTION

The present invention relates generally to racks for holding objects such as compact discs and other similar items, and more specifically to providing a motorized rack that can retain and display over one hundred compact disks (CDs), and preferably two hundred or more CDs.

BACKGROUND OF THE INVENTION

CD holders having no moving parts and in the form of vertical towers or horizontal cabinets are known. But when a large quantity of CDs is stored, it can be difficult to display and select a desired CD, especially if the desired CD is stored in the lower portion of a vertical tower.

Applicants' parent application disclosed a motorized modular CD storage device or rack that could store a great many CDs or the like in a rotatable rack that could be rotated until the desired CD was displayed, at which time rotation could be stopped and the desired CD removed from the rack.

Notwithstanding that the disclosed rack could store a great many CDs or other objects and has met with great consumer success, there is a need for a rack with at least double the storage of the disclosed rack. Further, since CDs are often used in an environment with subdued ambient lightning, there is a need for a CD rack that can illuminate CDs retained by the rack, for ease of selection in such an environment. There is a need to promote ease of such of use of such racks, enlarged or otherwise, by providing an option for foot-operable variable speed, and stop and go operation of the rack. Finally, enlarging the holding capacity of such racks typically requires a larger base, for reasons of stability. However, enlarging the base can require a larger carton in which to ship such racks, thus adding to the overall cost of brining the product to the marketplace. Thus, there is a need for base mechanism that provides the requisite stability for a rack yet does not require a larger shipping carton. Further, such rack should provide an option to automatically cease rotation upon scan code recognition a CD or other retained object, or upon voice command from the user. Finally, it is preferred that such rack have the ability to be electronically daisy-chained to other such racks.

The present invention provides such racks.

SUMMARY OF THE INVENTION

In the preferred embodiments, storage capacity in a rack is increased by providing inter-connectable holders that form a rotatable loop or belt. In one embodiment, each holder can frictionally retain at least one object such as CD jewel case, and a multi-loop rack comprises side-by-side loops formed of inter-connectable holders that each retain a single object. In a more preferred embodiment, each holder can retain at least two such objects in a side-by-side configuration. Thus, a single loop of inter-connected such holders may be created in which more that one object is retained in each holder. In either embodiment, retained objects can be viewed by a user during loop rotation, and loop rotation can be halted by the user when a desired retained object is observed. At the top (and bottom) regions of the loop rotation, the retained objects are moved through a fanout region in which they may be especially easily removed from the halted loop, e.g., by grasping with the user's fingers.

Each holder embodiment preferably includes firs and second walls that are retained a spaced-apart distance from each other that is sufficient to admit and frictionally retain at least a portion of least one such object. To improve frictional retention, a holder-facing surface of at least one (and preferably both) of the walls includes a projection such as one or more projecting bumps or ridges. A holder that is sized to retain two objects will be approximately twice the width of a single-object holder. A two-object holder can include a partition wall that separates at lease a portion of acing surfaces of two objects retained in the holder.

Each holder further includes at lease one male (or first-type) interconnection mechanism and at least one female (or second-type) interconnect mechanism. These mechanisms are formed such that the male mechanism or a first holder interlocks with an adjacent second holder's female mechanism, and the female mechanism on the first holder interlocks with an adjacent third holder's male mechanism. The rotatable loop formed by inter-connecting such holders may be said to be modular in that loop length can be varied by adding or subtracting holders. Each holder preferably is integrally formed as a single piece component, for example by injection molding ABS type plastic.

The rotatable loop or loops are preferably disposed within a modular rack that includes left and right vertical supports that attached to a base member. A rack embodiment comprising separate loops formed from single-object interlocked holders will include a third vertical support intermediate the two side-by-side single-object holders. Although the loop or loops could be manually rotated, for example with a hard crank or simply by moving the holders with a hand, more preferably the loop(s) are rotatable using a single electric motor with associated drive sprockets and pulleys. In the preferred embodiments, there is a single sprocket rotation axis near the top fanout (or turnaround) loop region and a single sprocket rotation axis near the bottom fanout (or turnaround) loop region. However two or more parallel sprocket rotation axes could instead be provided in either or both fanout regions. The rack supports, sprockets, pulleys are preferably make from light weight ABS plastic.

The motor is operable from batteries mounted in the base member, or may be powered from an external source. One or more user-operable controls govern rotation direction and rotation speed of the loop(s) formed by the interconnected holders. One such control preferably is located on one of the vertical support members for use by the user's hand, and preferably equivalent controls may be disposed on the base member for use by the user's feet.

The base member preferably has user-attachable base side members that, when attached, enlarge the effective footprint of the overall base structure, thus enhancing stability of the rack. However when the rack is shipped by the manufacturer, the base side members are detached, which permits shipment to occur in a smaller and less expensive shipping carton.

The rack includes an optional light unit comprising, for example, several white light-emitting diodes (LEDs) and a diffuser. The light unit can be user-attached to a fanout region of the rack, preferably an upper portion of one of the vertical side members. When the motor is energized, the light source illuminates objects retained by the holders for ease of viewing and selection, and will continue to illuminate for a minute or so after motor rotation is halted by the user. Optionally the light unit can be provided with an optical scanner that scans barcode information attached to and identifying contents of objects retained by the rack. A remote control device can be user operable to command electronics optionally associated with the rack to halt loop rotation when the scanner recognizes a barcode desired by the user, the desired barcode having been communicated preferably remotely by the user to the electronics. If desired, the scanner unit could be augmented with a voice recognition system that would halt loop rotation when a user-vocalized identified object was recognized the scanner. Alternatively, if the user were sufficiently close to the rack to directly see the desired object, a voice command could be used to halt rack rotation to facilitate the user removal of the desired object for the rack. A rack may be electronically daisy-chained to one or more other racks such that user commanded rotation of one rack causes loops in all racks to rotate.

DETAILED DESCRIPTION OF THE PREFERRED EMBODIMENTS

Figure 1:
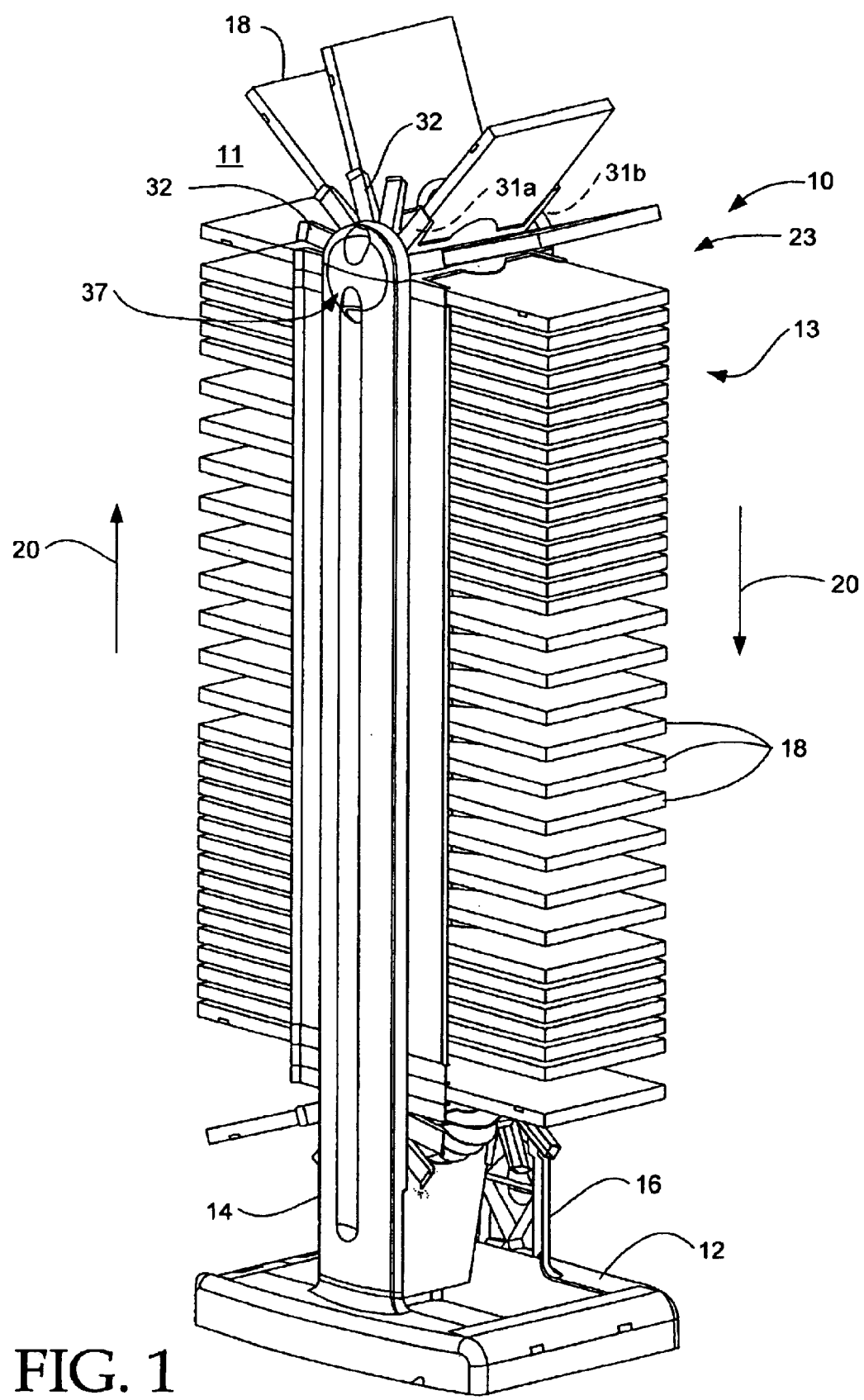
FIG. 1 is a perspective view of a rack, according to the present invention.

FIG. 1 is a perspective view of a tower-like rack 10 according to the present invention with which several containers 18 (or so-called jewel boxes) containing CDs are stored on a conveyer-like apparatus. The rack is a motorized device for retaining up to one hundred CDs in their individual jewel case, using holders 32 that are linked together to form an endless belt. As described later herein, the belt of linked-together holders can be driven by an electric motor 28 (see FIG. 3).

Using appropriate controls, for example knob 37 connected to an electrical switch (now shown) may be used to connect motor 28 windings to DC voltage of a first polarity, an opposite second polarity, to decreased magnitude voltage of either polarity, of to no DC voltage at all. The result is to cause belt rotation in a clockwise direction (e.g., as indicated by arrows 20), in a counter-clockwise direction, to reduce motor rotational speed from high to low, or to halt all movement of the belt by disconnecting operating voltage from motor 28. As shown in FIG. 1, control 37 enables a user to cause belt rotation until the desired object (typically a CD enclosed within a jewel case container 18) reaches the top region 11 of the rack (or tower), at which region (as well as at the bottom most region) the containers fan-out, which facilitates their manual removal from the rack by a human hand. Normally, in the vertical belt regions 13, the containers 18 are retained so closely to one another that their removal from the holders would be difficult. However the fan-out that occurs in the turnaround region 11 eases user-removal of desired object 18 from the rack.

Figure 9:
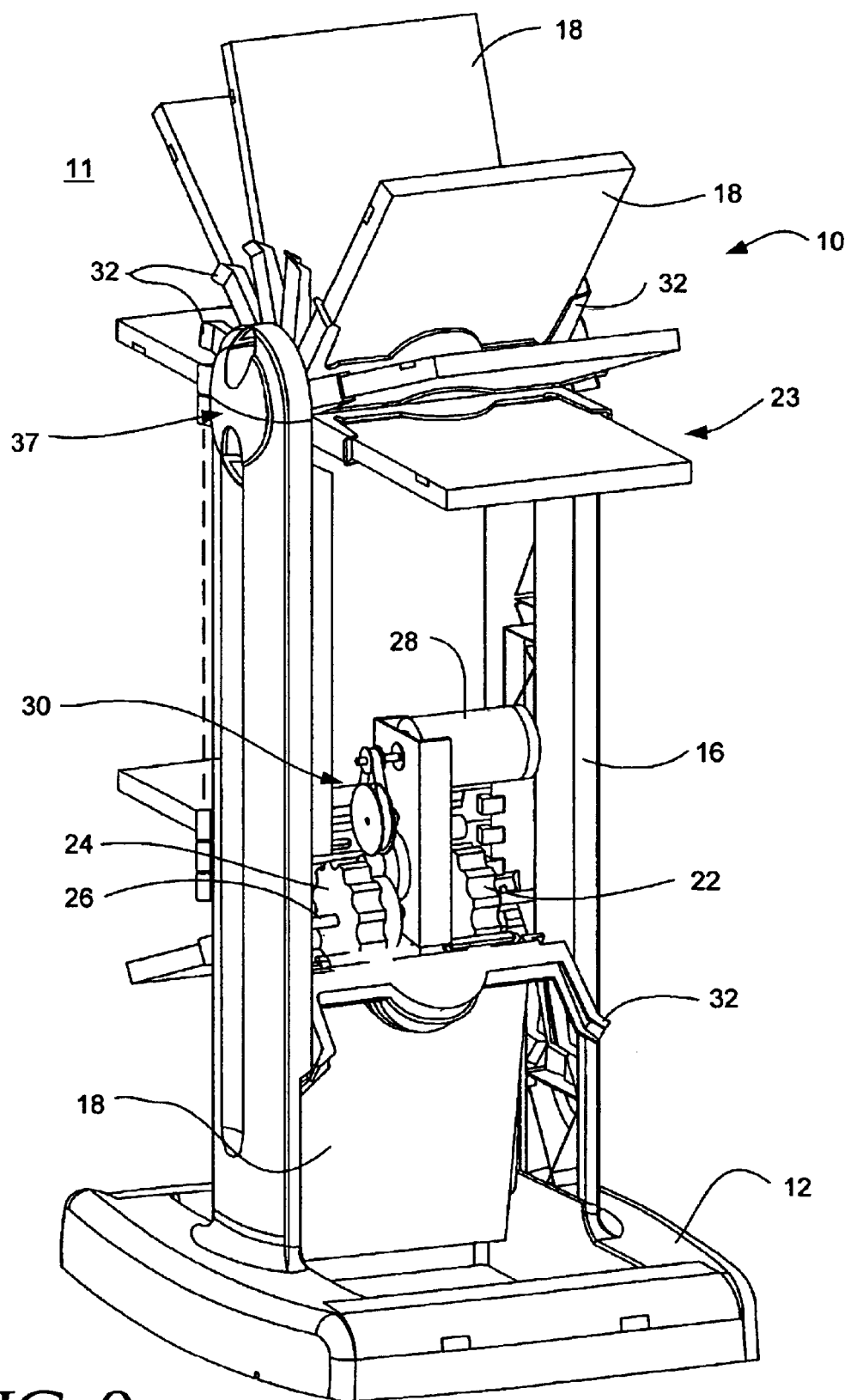
FIG. 9 is a perspective view similar to FIG. 1, and has been cut awy to show the interior mechanism of the rack and its operation.
Figure 10:
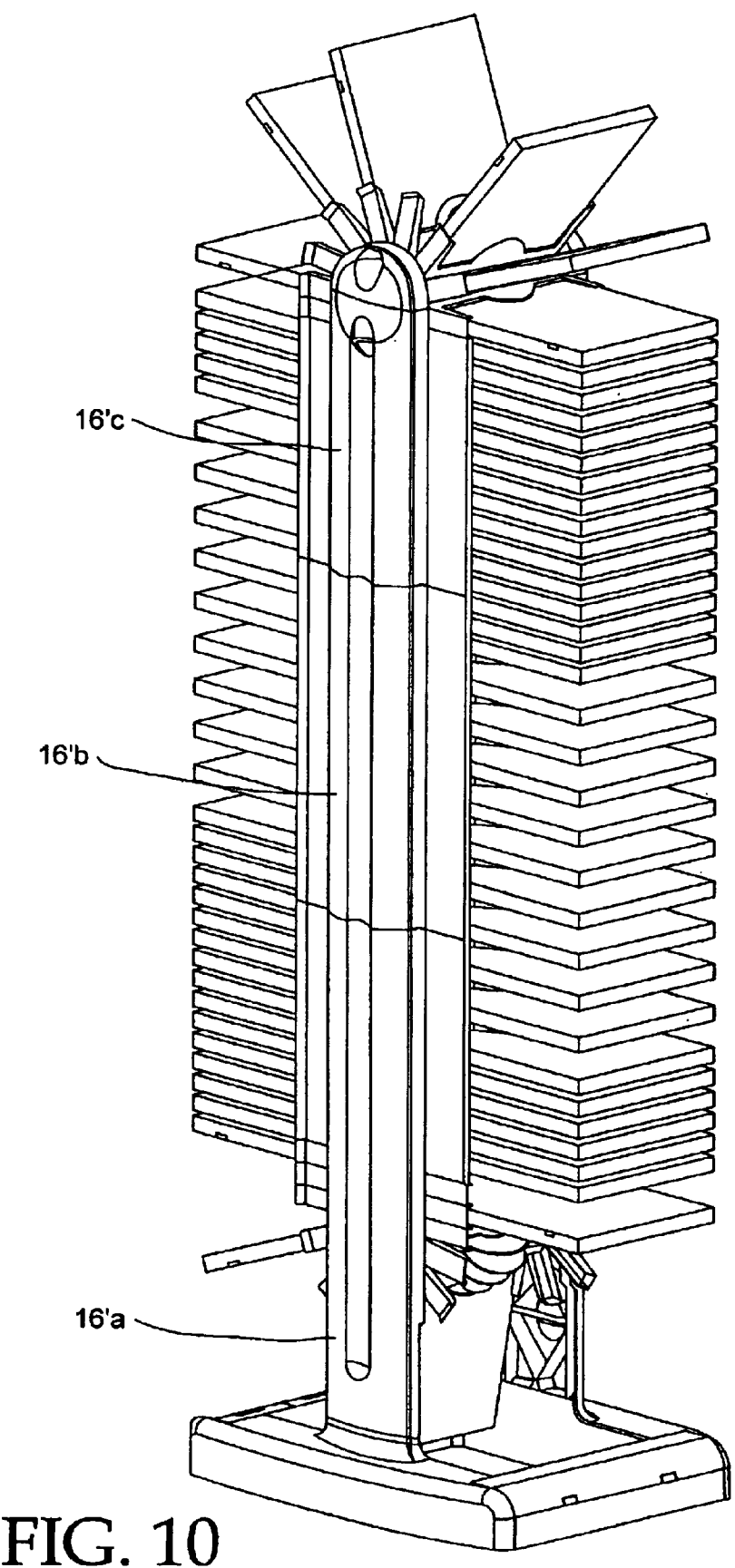
FIG. 10 is a perspective view similar to FIG. 1, illustrating an alternative embodiment.

Racks 10 such as depicted in FIGS. 1, 9 and 10 that rotate a linked-together loop 23 formed from holders 32 that retain only a single object 18 will be referred to herein a single loop racks. By contrast, rack embodiments such as shown in FIG.

Figure 15A:
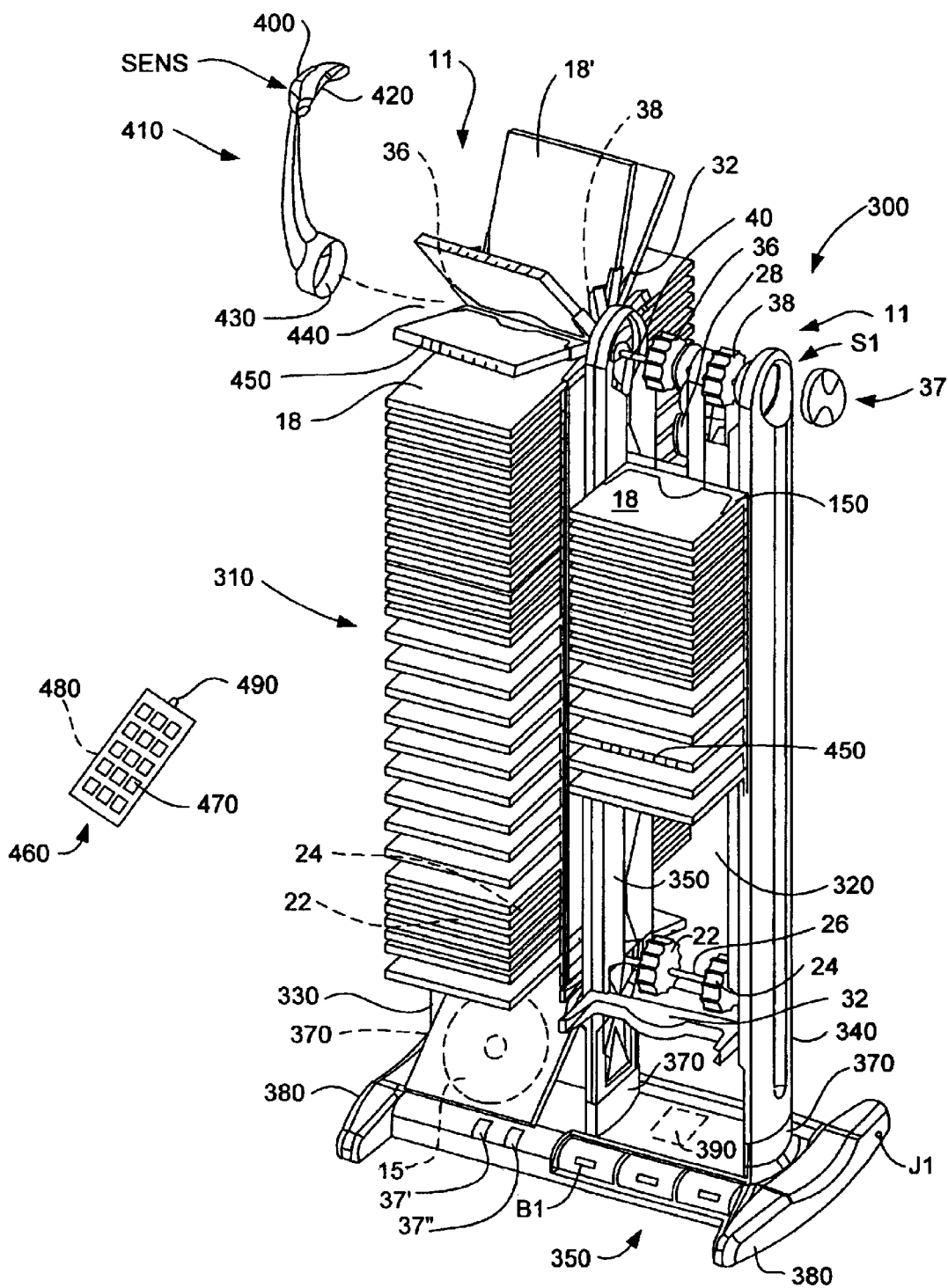
FIG. 15A is a perspective view of a first embodiment of a double-loop rack comprising interconnected single object holders, according to the present invention.
Figure 15B:
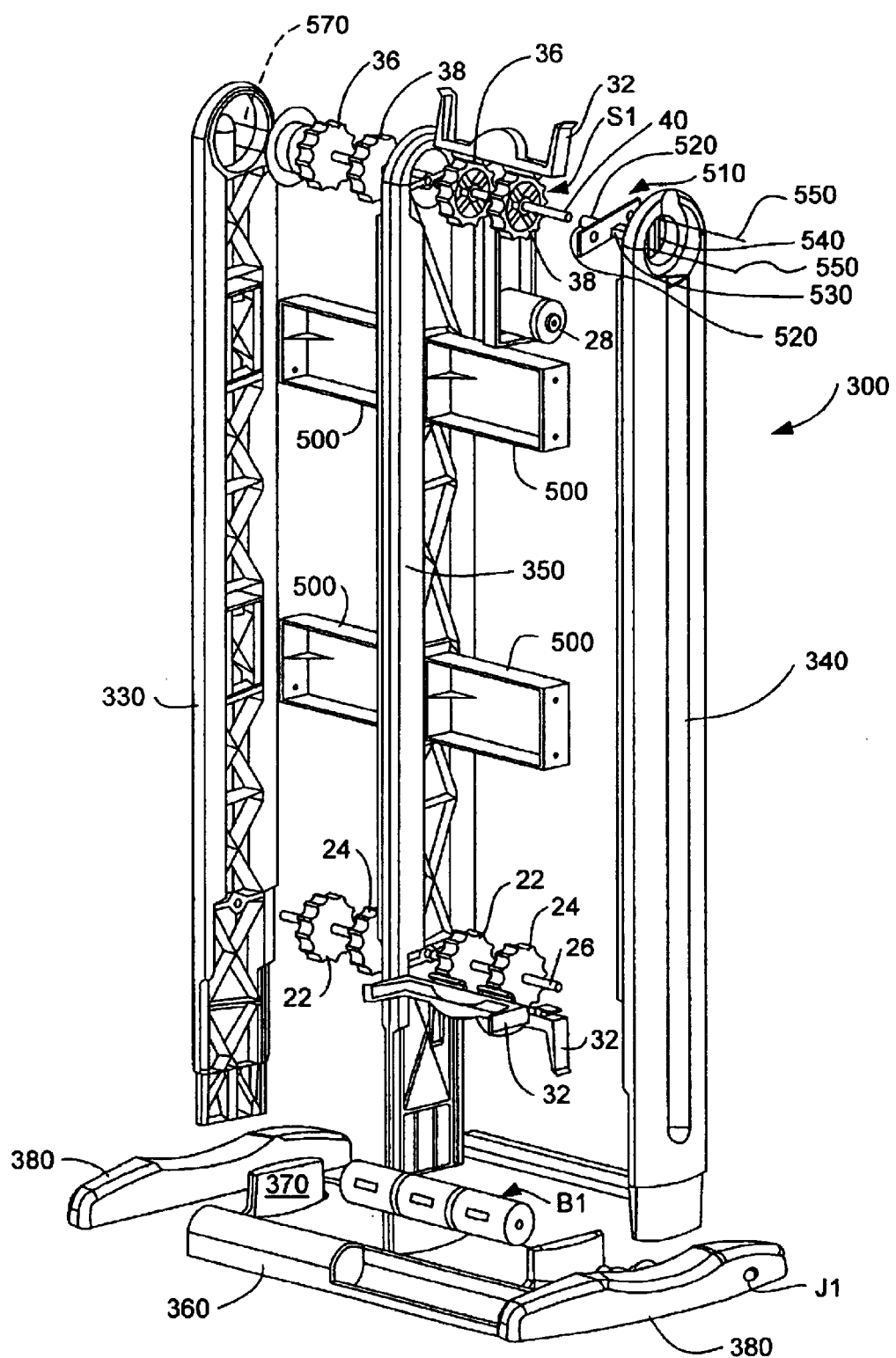
FIG. 15B is a perspective skeletal view of the embodiment of FIG. 15A.
Figure 15C:
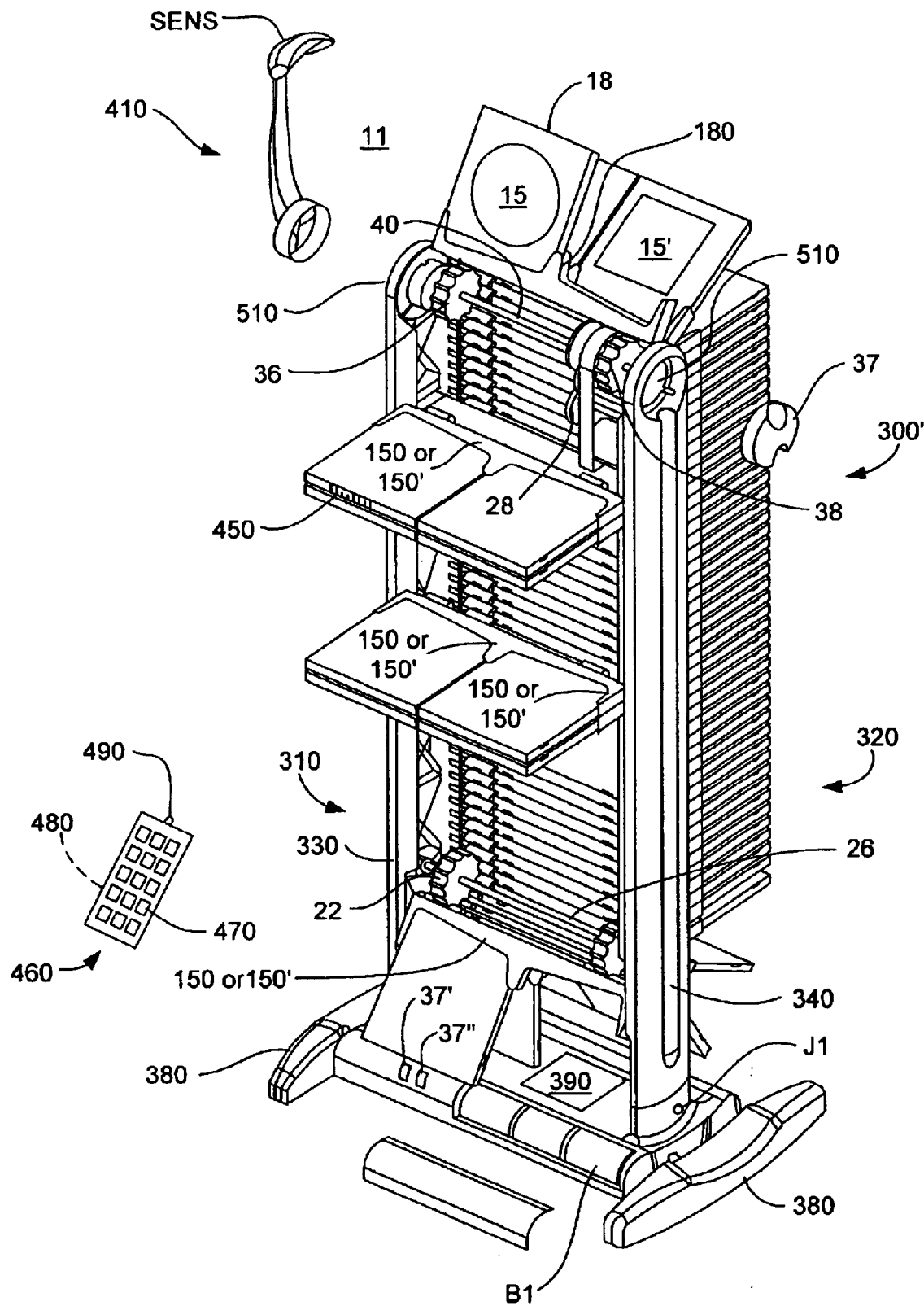
FIG. 15C is a perspective view of a second embodiment of a double-loop rack comprising interconnected double object holders, according to the present invention.

15A rotate linked-together loops 310, 320 formed from similar holders, whereas the rack embodiment of FIG. 15C rotates a loop 310 formed from linked-together holders 150 or 150' that can each retain two or more objects. Racks such as shown in FIGS. 15A and 15C will referred to herein as multi-loop racks.

As shown in FIG. 1, the continuous belt or loop 23 formed from linked-together holders 32 preferably is vertically disposed between a pair of opposed spaced-apart vertical. Supports 14 and 16, that are attached to a base 12. An alternative mounting configuration to the base and vertical support structure shown in FIG. 1 could include affixing loop 23 for rotation against a vertical structure such as a wall. Although the preferred embodiments will be described with respect to electric motor loop rotation, motor 28 could be replaced (or augmented) by a hand crank that a user could rotate to rotate the belt or loop. The various structures depicted in FIG. 1 are preferably fabricated from an inexpensive, light weight material such as ABS-type plastic, although other materials may be used.

Objects or containers 18 are releasable retained by friction of by flexible coupling with holders 32, as will be described with reference to FIGS. 4 and 5, which depict holder 32 in further detail and with different orientations. Each holder 32 includes a pair of fingers 34 and 35 that are spaced-apart a distance sufficient to receive at least on edge portion of container 18 in the slot-like space 33 formed therebetween. Figures 24 and 35 receive the left and right edges (or sides) of a container that is inserted into the slot-like space 33.

Figure 4:
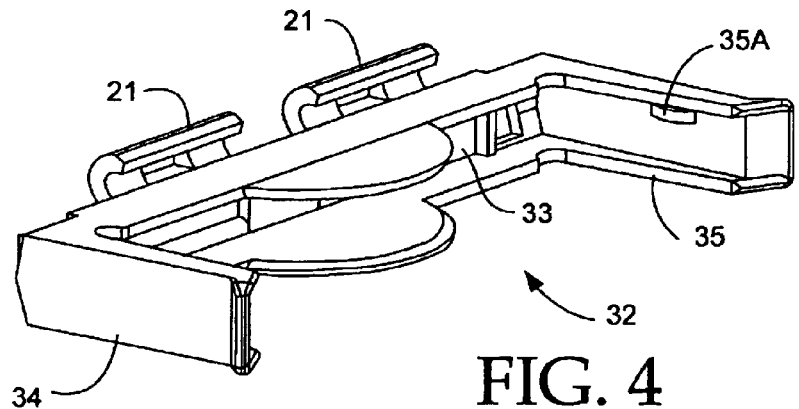
FIG. 4 is a perspective view of a single object holder for the present invention, shown in one view.
Figure 4A:
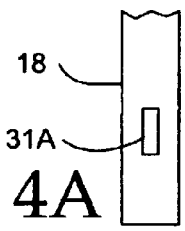
FIG. 4A is a side view of a container retainable by the holder of FIG. 4.
Figure 5:
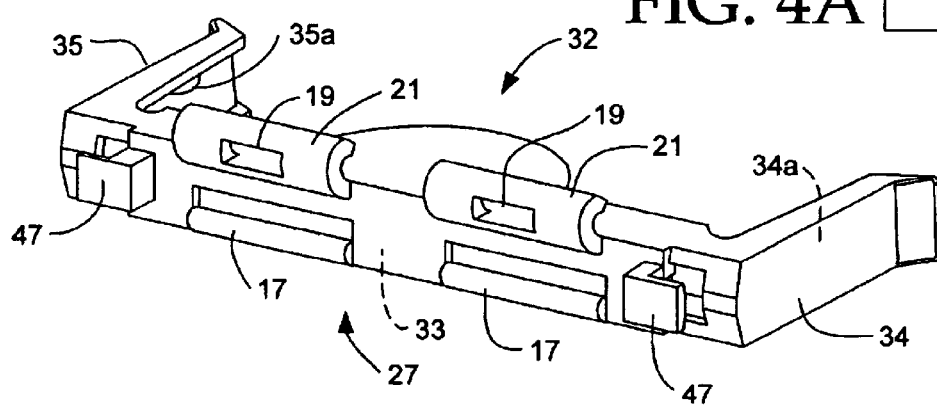
FIG. 5 is a perspective of the holder of FIG. 4, shown in another view.

In the embodiments described in the parent application, the internal surfaces of FIGS. 34 and 35 preferably included projections 35a and 34b (see FIGS. 4 and 5). These arms and projections promoted receiving the left and right edges of a container 18, which would be releasably and frictionally retained until selected and removed from holder 32 by a user. Projections 34a and 34a are sized and positioned to interlock with mating slots or depressions (e.g., slot 31a in FIG. 4A) that are formed on the sides of container 18. Containers 18 typically are manufactured with two such slots are formed to produce interior tabs that can retain printed information concerning the CD within the jewel cases. In the present invention, mating between holder arm projections 35a, 34a and jewel cases slots 31a (and corresponding 31b, not shown) can provide a positive coupling between containers and holder. The somewhat flexible nature of figure 34 and 35, holder 32 preferably having been formed from ABS type plastic, further contributes to the retention of a CD jewel case.

Figure 6A:
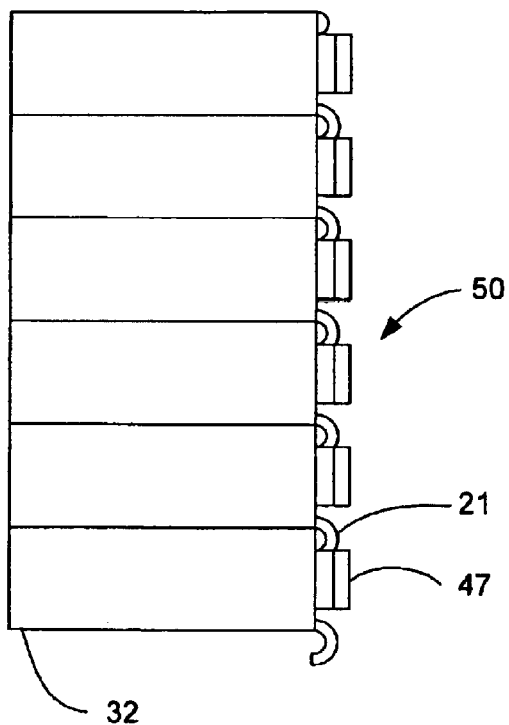
FIG. 6A is a side elevation view illustrating several holders of FIGS. 4 and 5, coupled together.
Figure 6B:
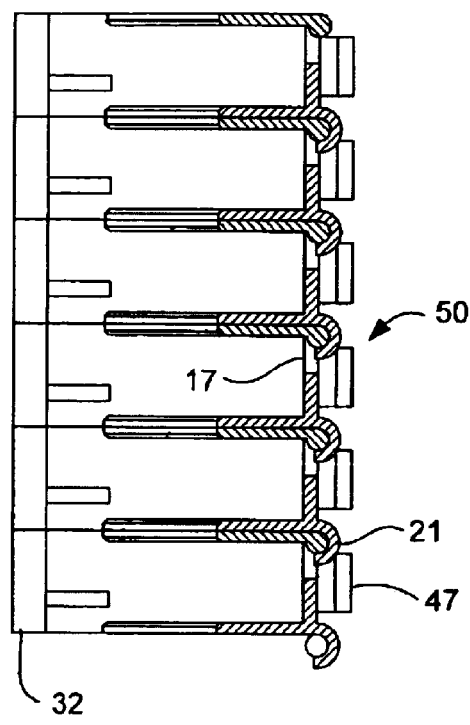
FIG. 6B is a cross-sectional view of FIG. 6A.

The formation of belt 23 by snapping-together adjacent holders 32 will now be described. In overview, each holder 32 includes hinged coupling means or mechanism 50 that allows adjacent holders to be flexible coupled to one another. In this fashion, using nothing but the holders themselves, a continuous loop or belt 23 of linked-together (or hinged-together) holders is formed, for example as shown in FIGS. 6A and 6B. Preferably the coupling means is sufficiently flexible to permit the loop or belt thus formed to turn around on a sprocket, for example at turnaround region 11 shown at the top of FIG. 1. The user of a snap-together type coupling not only permits easy assembly of a continuous loop or belt using nothing but the holders themselves. Further, as described later herein, a snap-together type coupling contributes to the modular nature of rack 10 by allowing additional holders to be added to expand the rack storage capacity.

Referring now specifically to FIGS. 4 and 5, each holder 32 includes first and second snap together couplings 17 and 21, preferably formed on the inward-facing base surface 27 of holder 32. Preferably the first coupling is a male or ball type 17 and the second coupling is a socket or female type 21. As best seen in FIGS. 4 and 5, the male couplings and the female couplings are disposed on opposite sides of slot-like region 33. Male type coupling 17 preferably has a curved cylindrical shape to hook or snap into a mating female socket 21 on a next adjacent holder 32 coupling.

Figure 7:
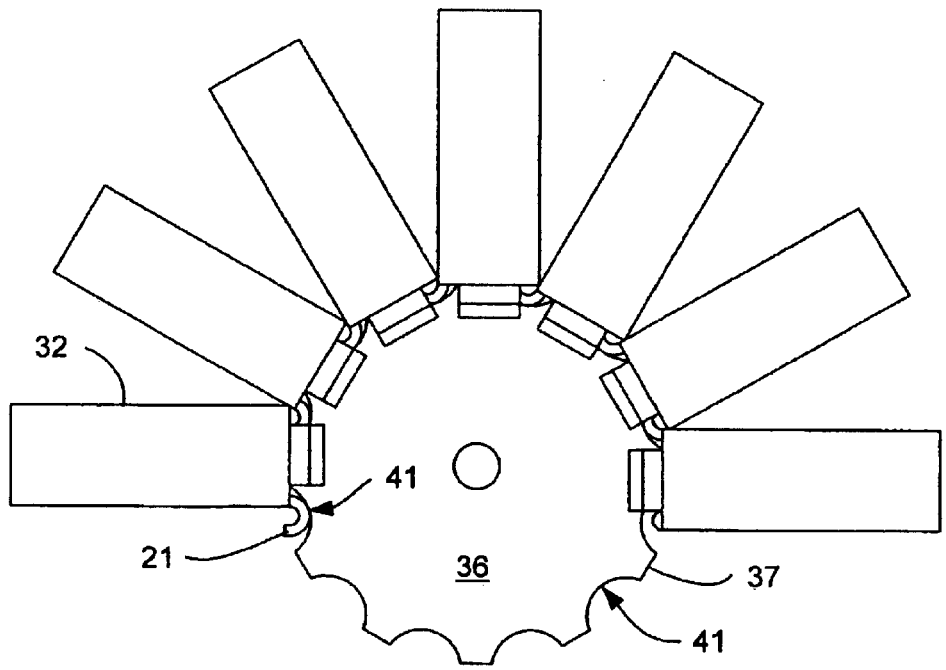
FIG. 7 is side elevational view illustrating the holders of FIG. 6A, as they would be rotated around a sprocket.

As shown in FIG. 6B, a snapped-together male and female coupling (from adjacent holders 32) form a hinge 50. Such coupling advantageously helps holder 32 to be sufficiently flexibly interlinked so as to rotate around a sprocket 36, e.g., as shown in FIG. 7. In addition, as shown in FIGS. 6A and 6B such coupling also permits adjacent holders to maintain their physical contiguous relationship with each other when rotated into vertical up and down portions of travel. Such close relationship advantageously helps rack 10 maximize storage density. Referring to FIG. 5, slot 2. As described further with respect to FIG. 8, holder 32 preferably includes a pair of somewhat L-shaped slideable interlocks 47 that project from the inward facing surface 27 of holder 32 to define gaps or slots 42.

Referring once more to FIG. 7, the curved exterior surface of male coupling 17 normally is seated in the grove or valley 41 between adjacent teeth 37 on a sprocket 36. Such mating engagement not only makes effective engagement between continuous loop 23 of interlocked holders 32 and a drive sprocket 36, but advantageously promotes fan-out of holders 32 and their associated containers 18 at turnaround regions, e.g., region 11, as shown in FIGS. 1, 2, 7, 9 and 10. As noted, such fanout permits a desired container 18 to be readily removed from rack 10 with a user's ringers.

Figure 2:
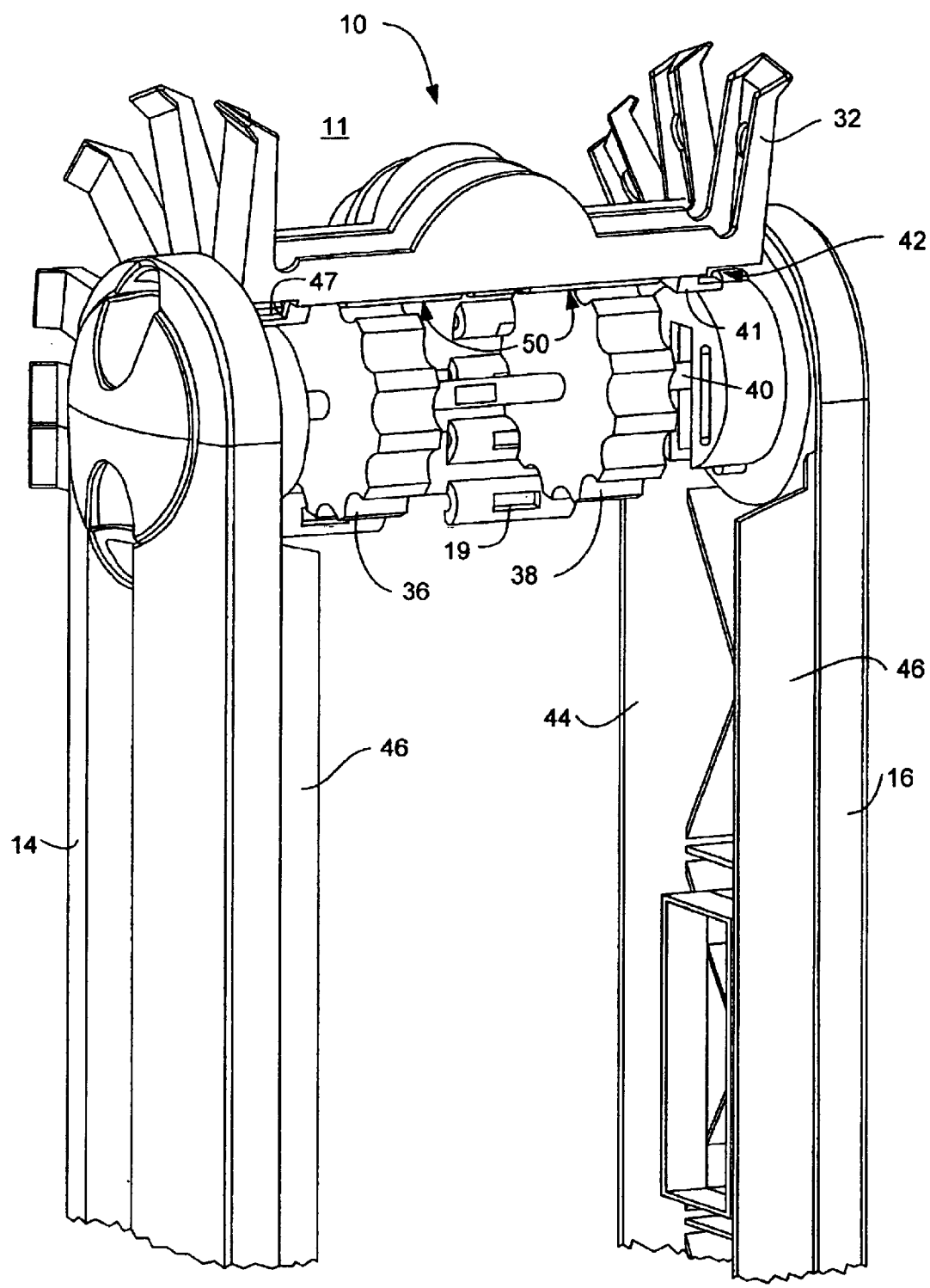
FIG. 2 is an enlarged detailed perspective view of an upper portion of the rack of FIG. 1.

Referring now to FIG. 2, drive sprockets 36 and 38, which rotate on a shaft 40 journaled within vertical supports 14 and 16, are disposed within the upper portion of rack or tower 10 and are caused to rotate by energizing motor 28 (see FIG. 3), e.g., by use of control 37 (see FIG. 1). Use of a pair of sprockets 36 and 28 provides a balanced drive to the continuous loop 23 formed by inter-connected holders 32. To ensure sufficient tension in the loop, customized bearing blocks that act as shims are used to mount shaft 40.

Figure 3:
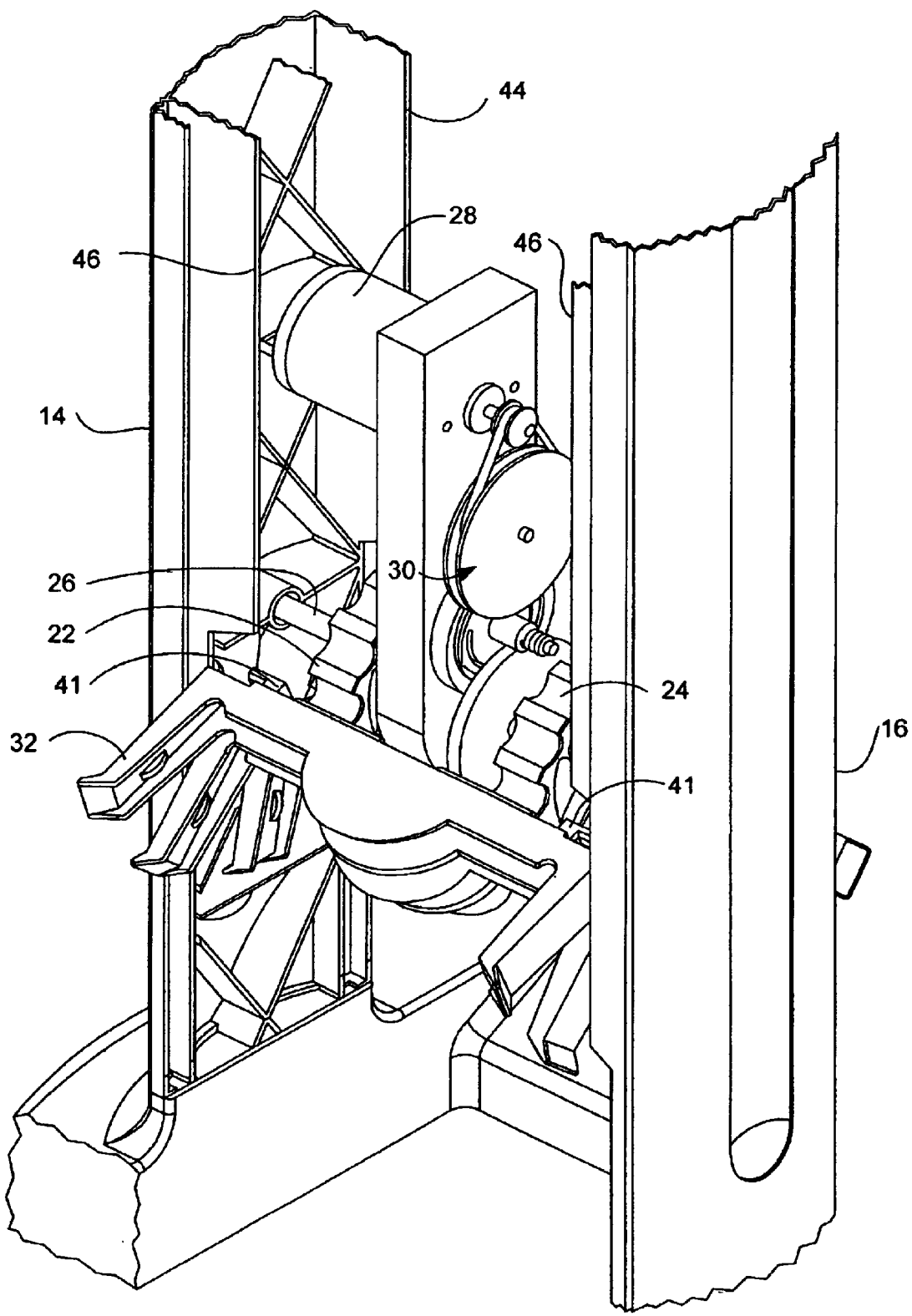
FIG. 3 is an enlarged detailed view of a lower portion of the rack of FIG. 1.

FIG. 3 provides further details of the drive system. In the parent application, motor 28 drove lower drive sprockets 22 and 24 through a pulley arrangement 30. Motor 28, sprockets 22 and 24, and pulley 30 where disposed near the base portion of rack 10.

Figure 8:
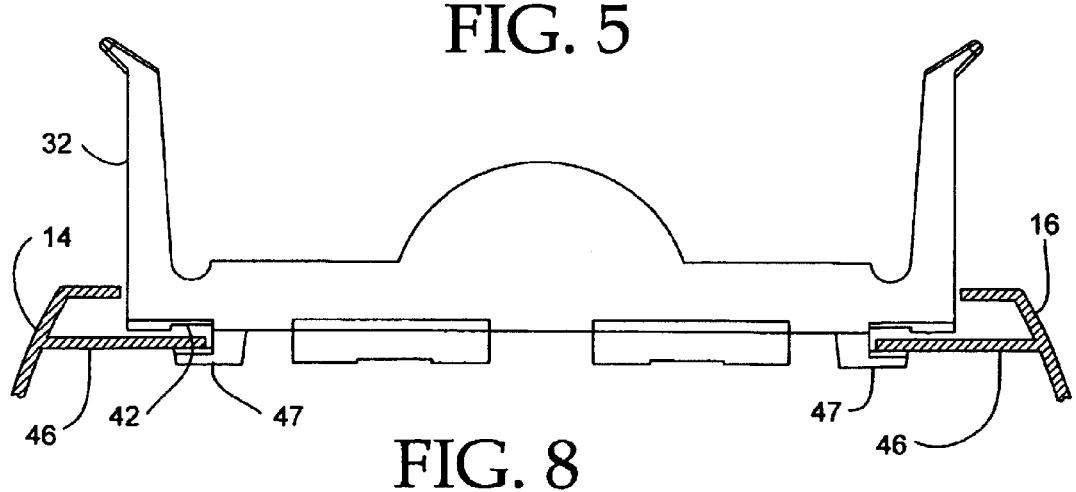
FIG. 8 is a cross-sectional view illustrating a holder of FIGS. 4 and 5, as it would retained in the rack of FIG. 1.

Referring to FIGS. 2 and 3, vertical side supports 14 and 16 preferably include rails 44 and 46 to effectively guide and retain continuous loop 23 in cooperation with the slidable interlock units 47 formed on base side 27 of holders 32. This cooperation between rails 44, 46, interlock units 47, and slots 42 is best seen in FIG. 8. Together these components facilitate retained vertical up or down sliding travel of holders 32 within vertical supports 14 and 16. As shown in FIG. 2, rails 46 and 44 terminate before upper turnaround region 11 (and also terminate near the bottom turnaround region) to facilitate installation of bearing blocks, or other mechanism to adjust tension in loop 23.

FIG. 9 depicts the interior or rack 10 and shows elements depicted in FIGS. 2 and 3. Using control 37, the user will cause belt 23 to rotate until a desired object 18, e.g., a jewel case, is moved to upper region 11, whereat a fanout of the retained jewel cases occurs. The user then stops belt rotation with control 37, e.g., by interrupting flow of operating power to motor 28, whereupon the desired jewel case 18 (and CD within) are easily removed from the holder in region 11, with the user's fingers.

As noted earlier, belt 23 may be varied in length by adding or subtracting inter-lockable holders 32. FIG. 10 depicts an modular embodiment of rack 10, in which left and right vertical support members 14 and 16 are modular, and comprise, for example, vertical support segments 16'a, 16'b and 16'c. A rack 10 comprising a great many interlocked holders 32 might include more vertical segments 16a, 16, 16c . . . , to lengthen the rack height to accommodate the increased length of belt 23.

Finally, to further automate selection of CDs, a bar code strip may be attached to each container 18. A bar code reader can be included with rack 10 such that each bar code strip is read as the jewel case 18 are rotated. Upon recognizing a user-desired CD selection by its bar code, rotation of belt 23 can be halted automatically by the bar code reader, whereupon the desired CD and its jewel case can be removed, preferably from fanout region 11 near the top of rack 10.

Figure 11:
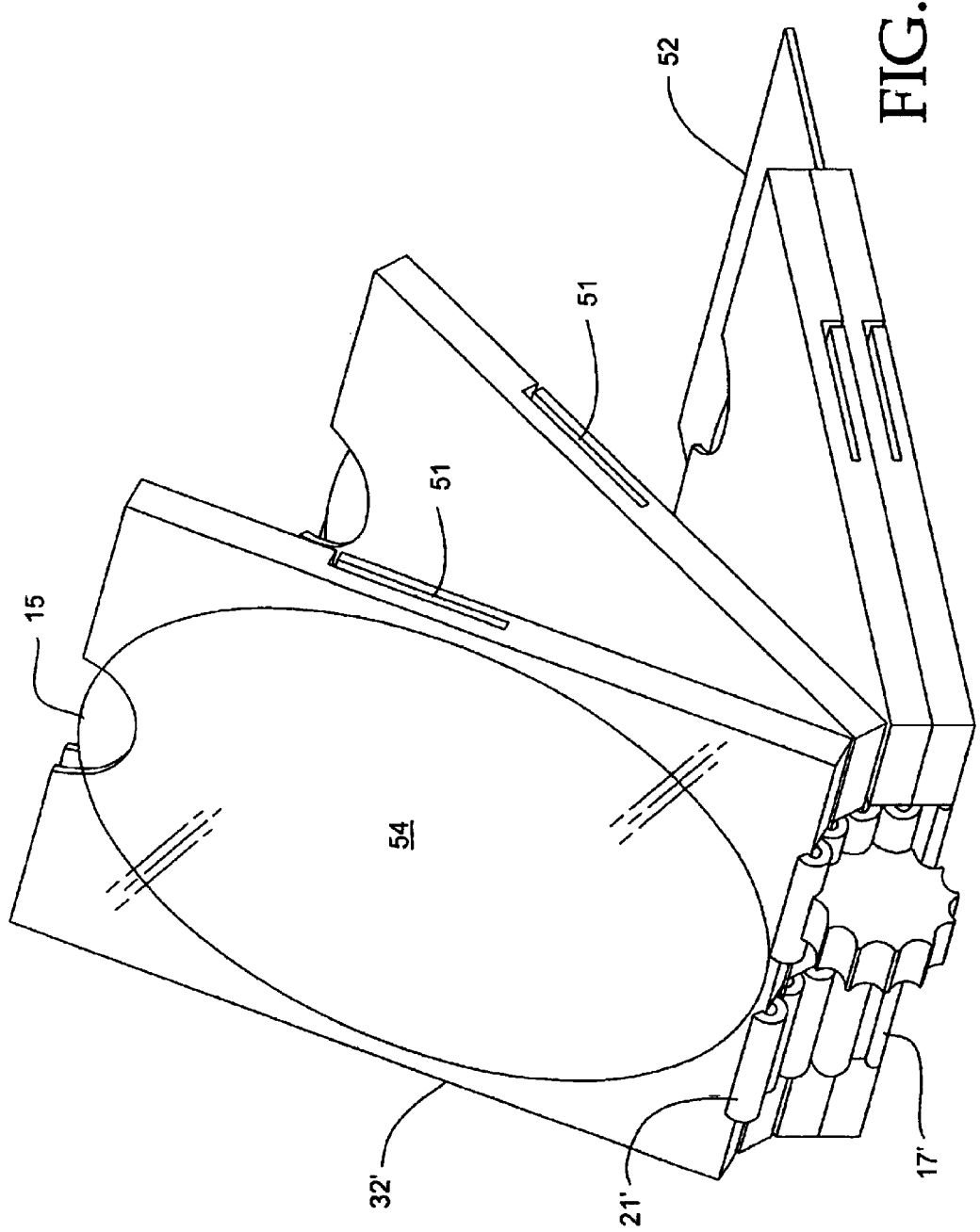
FIG. 11 is a perspective view of an alternative embodiment of a holder.

FIG. 11 depicts a holder 32' that can increase CD holding capacity for a rack, according to the present invention, by omitting the jewel cases. Holder 32' provides a substantially square housing into which a compact disc 15 may be inserted, without a jewel case. The bare CD is retained within holder 32' by frictional fingers 51. The bottom of holders 32' include couplings 17', 21', which may be the same as couplings 17, 21 described earlier herein for holders 32. Since holders 32' need not be as thick or as durable as commercial CD jewel cases, the thickness of holder 32', may be less than half the thickness of a standard CD jewel case. Thus, for a given rack heights, the user of holders 32' would permit storing perhaps two hundred fifty CDs, as contrasted to perhaps on hundred jewel cases enclosed CDs for the embodiment of FIG. 1.

Figure 12:
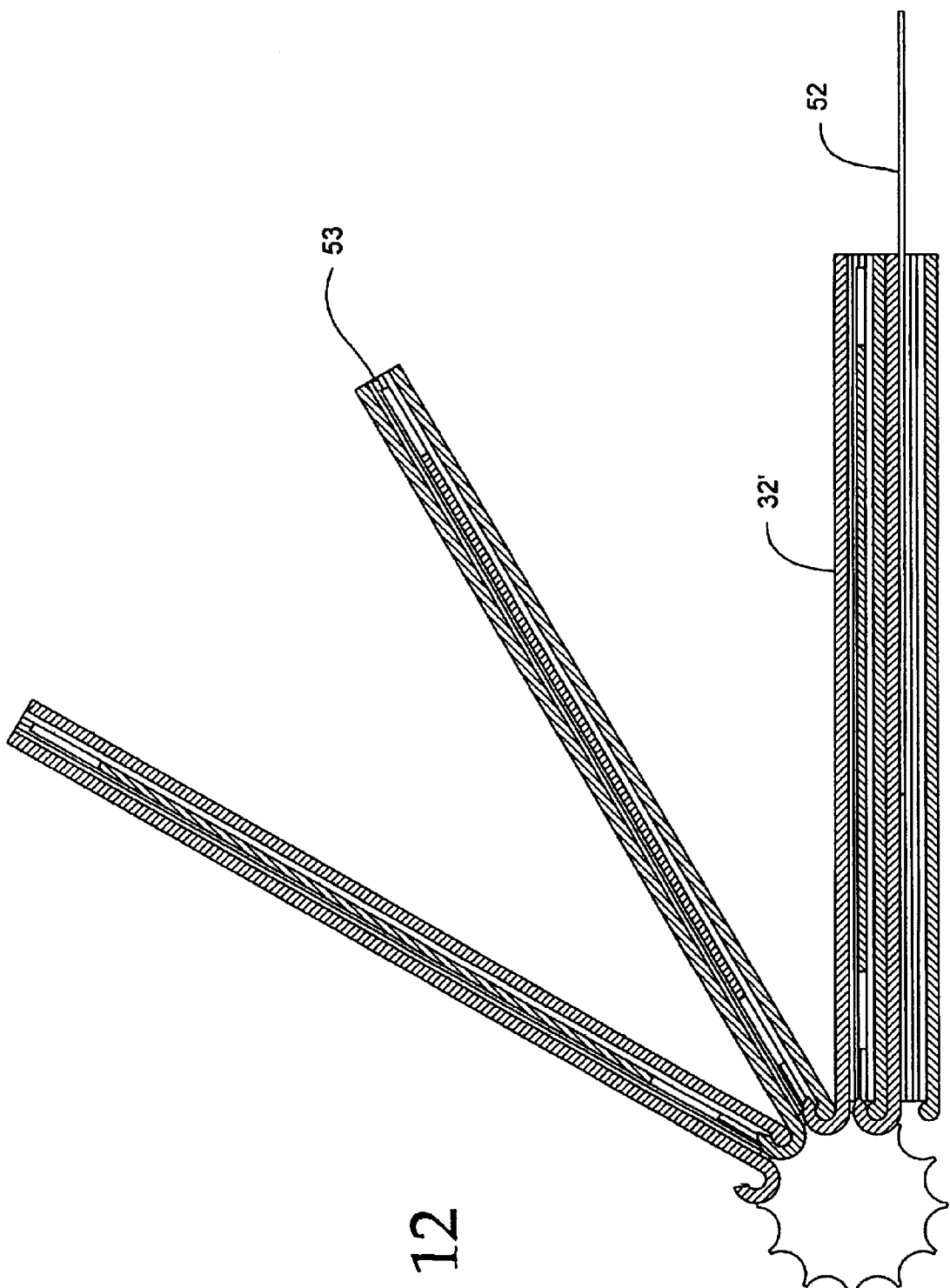
FIG. 12 is a cross-sectional view of FIG. 11.

In addition to holding a CD, as shown in the cross-section of FIG. 12, holder 32' also provides a slotted space that may be used for promotional printed literature 52, e.g., a written description of the retained CD. Advantageously, holder 32' may be provided with a felt wiper 53 to wipe dust from a CD 52 retained within the holder. Preferably holders 32' are transparent such that the retained CD or any retained written description can be viewed to assist the user in making a selection.

Figure 13:
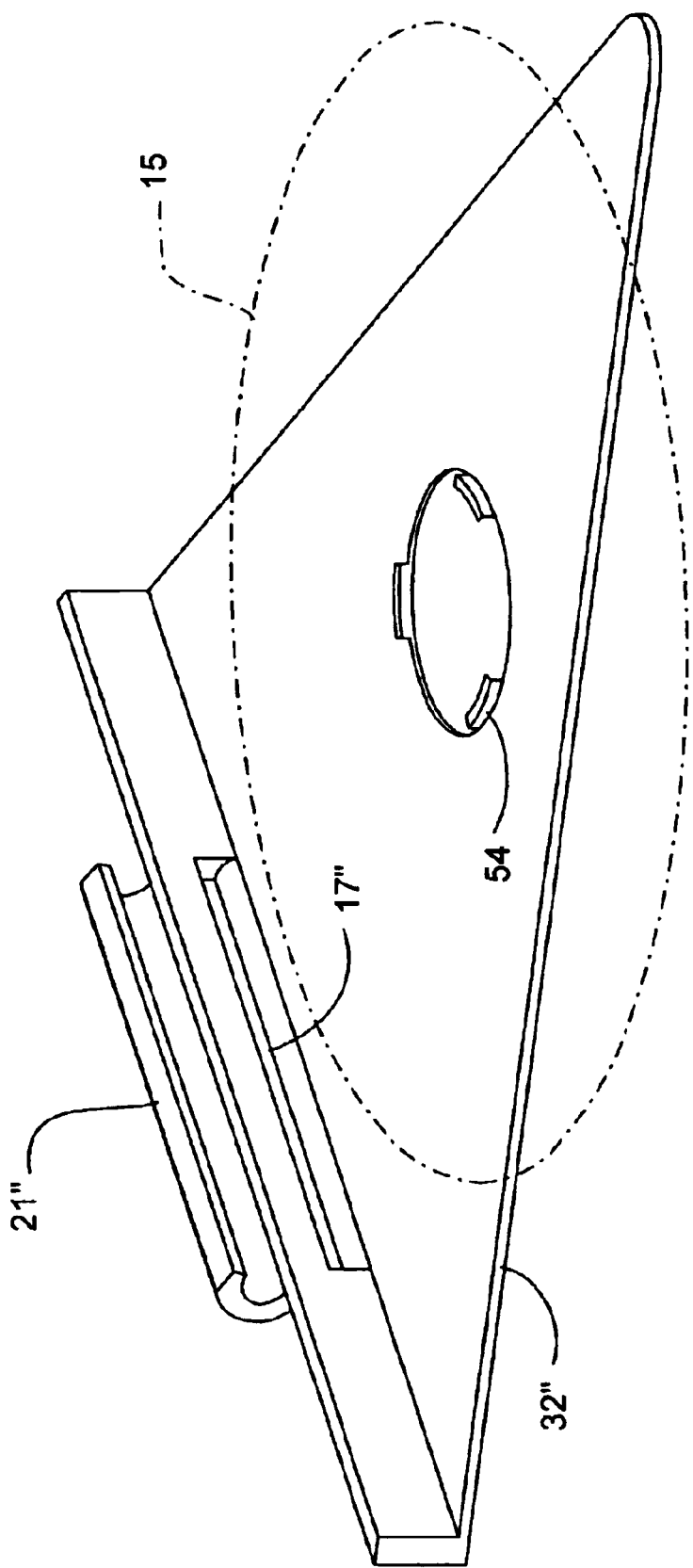
FIG. 13 is a perspective view of an alternative embodiment of a holder that retains a CD without a jewel case.

FIG. 13 depicts an even more compact holder 32", which is pie shaped and includes couplings 17" and 21" that can interlock with other such couplings on an adjacent holder 32' to form a continuous loop of holders 32". A friction-type hub 54 is formed near the center of holder 32' and is sized to engage and retain the central aperture of a CD 15 to be retained by the holder. Friction hub 54 may be formed on one or both surfaces of holder 32', to accommodate retaining, respectively, one or two CDs per holder. Although holder 32" provides minimal protection of retained CDs, the holder thickness is reduced to a minimum, which can contribute to even greater storage capacity for a rack of a given height.

Figure 14A:
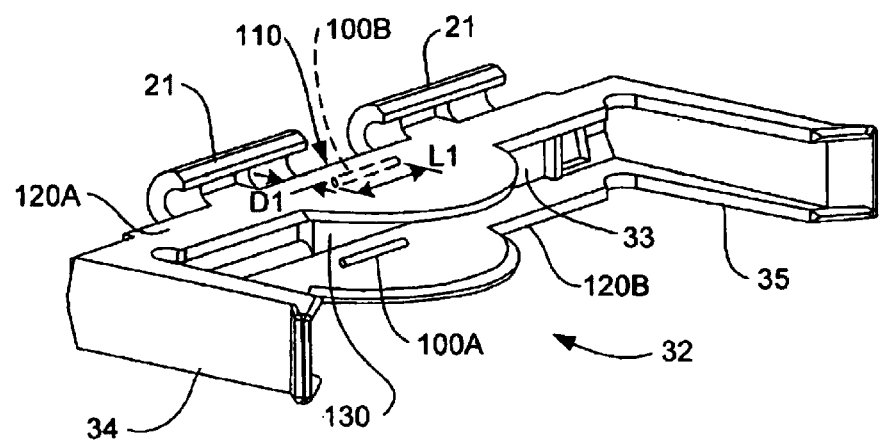
FIG. 14A is a perspective view of a single object holder depicting an alternative projecting mechanism for retaining an object, according to the present invention.
Figure 14B:
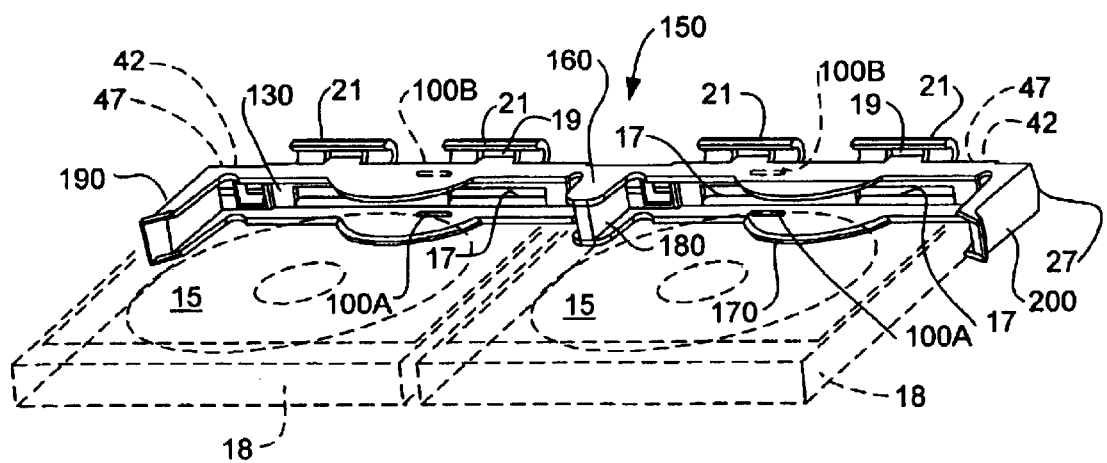
FIG. 14B is a perspective view of a double object holder depicting a preferring projecting mechanism for retaining objects, according to the present invention.

Turning now to FIGS. 14A and 14B, improved jewel case holders are depicted. Holder 32 is FIG. 14A in many ways is similar to holder 32 as depicted in FIGS. 4 and 5, except that side projections 35a and 34b are replaced with projecting bumps or ridges 100A and 100B. Ridges 100A and 100B are formed on the inner, jewel cases facing, surface of upper and lower holder walls 120A and 120B. These ridges preferably are injection molded when holder 32 is fabricated and frictionally retained the projecting ridge that is formed on the perimeter of CD jewel cases. The ridges may be formed as a series of separate bump-like projections, and/or as continuous projections. In FIG. 14A, ridges 100A and 100B are setback a distance D1 of about 0.275" from the inner surface of rear wall 130 of the holder, have a length L1 of about 0.3" and have a maximum vertical projection of about 0.07". In cross-section the ridges have a somewhat half-circle smoothed profile. Ridges 100A and 100B need not be formed as continuous projections, and may instead be formed as one or more separate bump-like projections. Regardless of their specific configuration, projections or ridges 100A and 1001B help frictionally retained a jewel cases with holder 32, even if the jewel cases is inserted upside down. By contrast, the configuration of FIG. 4 required jewel cases to be properly aligned because recesses 31a with which holder projections 35a and 35b mated where formed only on the edges of the jewel cases closes to the hinged jewel cases lid. Other ridge configurations and/or positions could instead be used, and indeed projections or ridges 100A, 100B could be replaced with strips of rubber or other material to help frictionally retain a jewel case inserted into holder 32.

Rack 10 as depicted in FIG. 1 provided a single continuous belt or loop 23 of holders. Various embodiments of the present invention are directed to a dual-loop rack that can provide two or more continuous belts or loops of inter-connected holders. FIG. 14B depicts a preferred embodiment of a holder 150 that can retain in a side-by-side configuration two CDs 15, each CD in its own jewel case 18. Many aspects of holder 150 are similar to holder 32 depicted in FIGS. 4–8. Holder 150 includes upper and lower walls 160 and 170 that are joined, at least partially, to a rear wall 130. Preferably inner surface regions of the upper and lower walls include projecting ridges 100A and 1001B that may be sized and disposed as described above with respect to FIG. 14A. Holder 150 further includes a partition sidewall 180 that joins at least a portion off upper and lower walls 160 and 170, and preferably includes left and right outer sidewalls 190 and 200. As was the case with holder 32 as shown in FIGS. 4–8 and 14A, preferably outer sidewalls 190 and 200 flare outwardly to help the user guide a CD jewel case into the retaining space 33 defined by the holder.

As will be described later herein, adjacent holders 150 are linked together similarly to the manner in which holders 32 (as depicted in FIGS. 4–8) were inter-connected. Thus, a preferably rear potion of holders 150 will include at least one male coupling 17 and at least one female coupling 21, which couplings 17 and 21 may be the same as those described earlier herein. By way of example, each half-section of holder 150 depicted in FIG. 14B has two couplings 17 and two couplings 21, although more of fewer than two couplings each could be employed. Slots 19 shown in FIG. 14B are, as before, artifacts associated with the casting of holder 150. The rear wall 130 of holder 150 includes two L-shaped slideable interlocks 47 that project from the inward facing surface 27 of wall 130 to define gaps or slots 42, similarly to what is shown in FIG. 8 for holder 32.

Figure 14C:
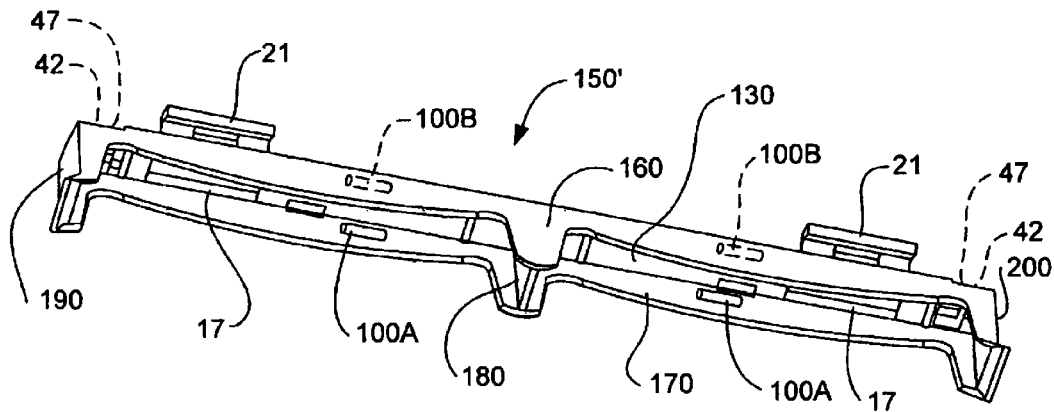
FIG. 14C is a perspective view of an alternative double object holder depicting a preferring projecting mechanism for retaining objects, according to the present invention.

FIG. 14C depicts another embodiment of a holder 150' that can retain more than one CD jewel case (or other object). The embodiment shown is similar to that of FIG. 14A in that two jewel cases are retained in a side-by-side configuration. It is noted, however, that the configuration of FIG. 14C provides a single coupling 17 and a single coupling 21 for each half of the holder, as contrasted with FIG. 14B in which more than one coupling pair was disposed on each holder half.

Figure 14D:
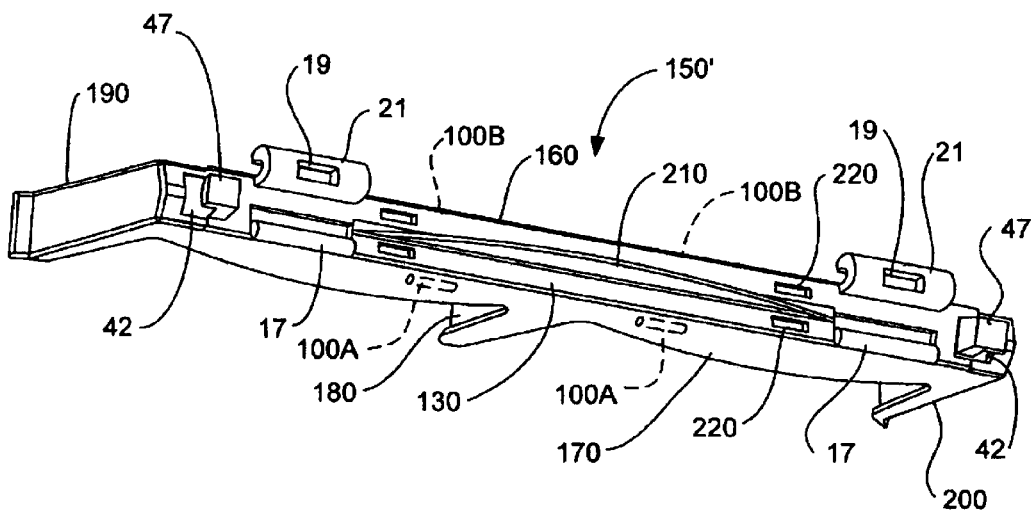
FIG. 14D is a rear perspective view of a double object holder, according to the present invention.

FIG. 14D is a rear perspective view of holder 150' as shown in FIG. 14C, and but for the number of couplings 17 and 21 could also serve as a rear perspective view of holder 150, as shown in FIG. 14B. An optional dorsal fin like member 210 may be provided on the rear wall 130 of holder 150' or 150 to aid in retaining alignment in cooperation with the driven cogs that rotate a belt formed of holders 150' or 150, linked-together by couplings 17 and 21. Slot pairs 220 show on rear surface 130 of holder 150' (or 150) are so-called core-through slots that are present to remove plastic from the region of the cast projections during manufacture of the holders.

Dual jewel case holders 150 and 150' will be approximately twice as wide as single jewel cases holders 32, and will thus measure approximately 10" across and be approximately 0.5" tall (excluding the height of couplings 17). As is seen from FIG. 14C, it is not required that left and right sidewalls (or arms) 190, 200 extend very far along the sides of a retained jewel case. Indeed, if desired one might substantially eliminate sidewalls 190 and 200 and rely upon the inner surface of the vertical support member (e.g., 14 and 16 in FIG. 1) to help retard a retained jewel case against unintentional disconnection from a holder. However even with sidewalls 190, 200 that project out 2" or so, a dual jewel case holder 150 or 150' will weigh less than about 1.5 oz. As with holders 32, 150 or 150', it is preferred that the holders are injection molded plastic, e.g., ABS type plastic, and that the entire holder in integrally formed as a single component, rather than as a partial component to which couplings 17 and/or 21 may later be affixed, or to which projections 47 may later be affixed.

Figure 14E:
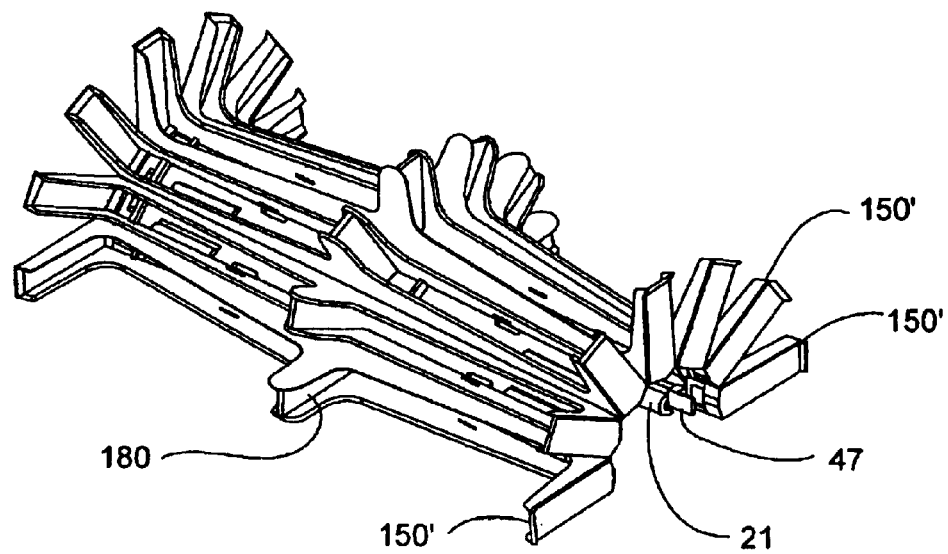
FIG. 14E is a perspective view of an upper fanout region portion of a loop of interconnected double object holders such as depicted in FIG. 14D, according to the present invention.

FIG. 14E depicts several inter-connected holders 150' as they might appear at the upper fanout region 11 of a loop on a rack, according to the present invention. As with other holders described herein, interlocking or inter-connection results from cooperation between male mechanisms 17 formed on one holder matingly attaching with a female mechanism 21 on an adjacent holder. As described earlier herein, preferably L-shaped slideable interlock projections 47 (with attendant gaps 42) preferably are formed on holder 150', which projections cooperate with rails 44 and 46 formed on vertical side supports 14, 16 during loop to help main proper loop disposition in the rack. As such, what is shown and described with respect to FIGS. 6–8 is also applicable to the various dual-object holder configurations.

Figure 14F:
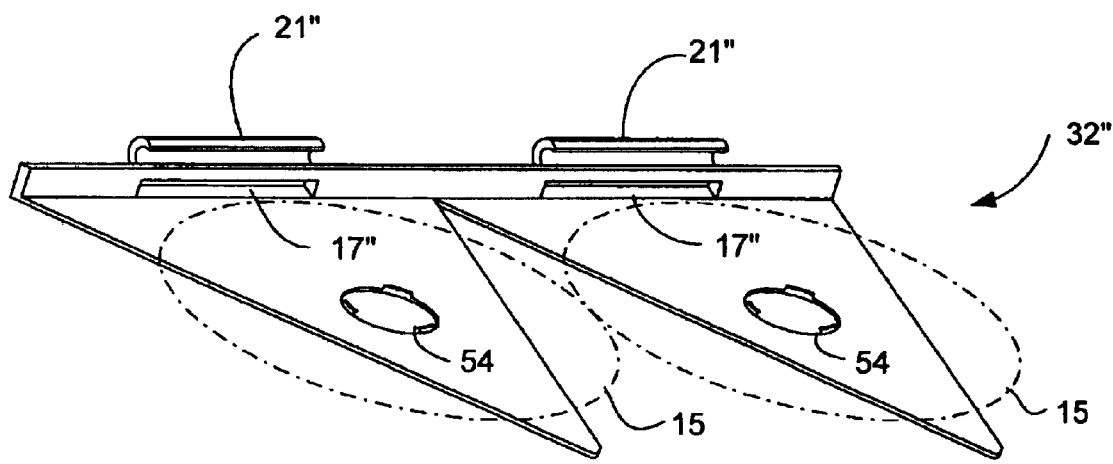
FIG. 14F is a respective view of a dual-object holder able to retain at least two CDs without a jewel case, according to the present invention.

As shown by FIG. 14F, a dual-object (or indeed four-object) holder may be provided that does not require jewel cases. FIG. 14F depicts a holder 32', each half of which can be similar to what was depicted and described with respect to FIG. 13. If hub projections 54 are formed on each side of holder 32", it is apparent that a single holder 32' could retain four CDs 15, without requiring that the CDs themselves be in jewel cases. Understandable a multi-loop rack 300 or 300" (see FIGS. 15A–15C) comprising inter-connected holders as shown in FIG. 14F can have a very large CD retaining capacity.

FIGS. 15A and 15B show a first embodiment of a dual-belt tower or rack 300 that provides two rotatable continuous loops or belts 310, 320 comprised of linked-together holders 32, for example holder 32 as shown in FIG. 14A, or holder 32 as shown in FIGS. 4, 5 and 6. In the rack configuration of FIGS. 15A, 15B, and 15C, loop rotation is about two axes: about rod shaft 40 near the loop upper fanout region 11, and about rod shaft 26 adjacent the loop lower fanout region. Preferably shafts 40 and 26 are made of metal for reasons of strength, whereas nearly all of the remaining components comprising rack 300 are preferably injection molded ABS-type plastic. In FIG. 15A, for ease of illustrating the drive mechanism, relatively few holder 32 retained jewel cases 18 are shown on loop 320. In the embodiment, loop 310 is comprised of inter-connected single jewel case retaining holders 32, and loop 320 is comprised of different inter-connected single jewel case retaining holders 32.

Rack 300 includes left and right vertical support members 300 and 340 and a central support member 350. These three support members are attached to a central based portion 360, for example by joining with sections 370 that project upward from portion 360. Dual-belt tower 300 can retain approximately twice as many CDs (e.g., CDs or other items in jewel cases) than single-belt tower 10 shown in FIG. 1. Accordingly, dual-belt tower 300 should have a larger effective base area (or "footpring") to promote stability and reduce the likelihood of the tower toppling over. For a tower height of perhaps 38", central base portion 360 will measure perhaps 8"×16". To provide a footprint that is larger than that of the base portion, outrigger-like side base projection 380' are attached to the sides of the base portion. The side base projections measure perhaps 2" side by 12" long and for the exemplary dimensions give, will provide an effective footprint of about 12"×16" versus 8"×16" for the central base portion alone.

As best seen in FIG. 15B, side base projections 380 preferably are removably attached to central base portion 350, for example by forming the side base projections with grooves that connect to projections formed in the mating portion of main base member 350. Other mechanical features may be formed in the central base portion and side base projections to permit interlocking, or interlocking can be accomplished using attachment mechanisms such as screws, wing nuts, or the like.

The advantage of providing user-attachable side base projections to increase the effective footprint of rack 300 is that with the side base projections detached, the rack (and side base portions) can be shipped in a smaller carton. The base cross-sectional area of the carton is substantially reduced to where the savings in the cost of a high quality cardboard carton with indicia printed on the sox sides can exceed 10%.

Central base portion 360 preferably includes a compartment for batteries B1 that can power motor 28, and optionally includes electronics 390 associated with an optional barcode scanning system 400 disposed in a clip-on type lamp unit 410 that includes a light source 420, for example at least one light emitting diode (LED). Lamp unit 410 attaches to a circular region at the upper portion of vertical support member 330, which region can be similar in size to the region to which control 37 is attached at the upper portion of vertical support member 340. Electrical contacts 430 in the base portion of unit 410 mate with contacts 440 in vertical support member 330. If no lamp unit is provided, the otherwise open circular region in the upper portion of member 330 can be plugged with a circular know, similar to control 37. Electrical wiring or traces interconnecting unit 410 to power source B1 (or external power provided via input jack J1) and, if present, to circuit 390 are disposed in or on the interior surface of vertical support member 330.

In a preferred embodiment, unit 410 includes at least light source 420, which illuminates whenever belts 310 and 320 are rotated, e.g., by single motor 28, and remains on for a brief time thereafter, perhaps a minute. The resultant illumination permits user selection CDs as they reach the fanout region 11, even if rack 300 is used in a dimly lit room.

Optionally jewel cases 18 may carry barcode information 450 that can identify the CD contents. Barcode information 450 may be created by the user, or by the CD manufacturer. A barcode scanner unit 400 preferably disposed within unit 410 can read barcodes 450 as the jewel cases are rotated into fanout region 11.

An optional handheld remote unit 460 includes keys 470, a power source 480 and an output transducer 90, and permits a user to cause electronics 390 (or at least a portion of the electronics) to recognize a user-desired barcode 450 when scanned by unit 410. Unit 460 can transmit desired barcode information to rack 400 using, without limitation, ultra sound, radio frequency, infra red transmissions. An appropriate sensor (SENS) detects the transmitted information, which is coupled to electronics 390. A user desiring to select a certain CD, a particular song, or perhaps a particular digital data base, or a software routine can input on remote unit 460 the appropriate identifying information, which is then transmitted to the sensor (SENS). As the two belts 310, 320 rotate, scan codes carried by any jewel cases within scan range of unit 410 are identified by unit 410, and electronics 390 can cause motor 28 to cease rotation. If desired, cessation of motor rotation can be intentionally delayed by electronics 390, to permit belt rotation to bring the desired jewel case to a more vertically upright disposition, e.g., case 18' in FIG. 15A. Remote unit 460 may be modified or unmodified generic control such as used on TVs and VCRs, or it may be an IR or Bluetooth-compliant PDA or laptop or desktop computer. Rather than manually key in the barcode per se, preferably remote unit 460 can transmit an abbreviated code that represents the full barcode of the desired CD.

In addition or alternatively, electronics 390 can be designed to recognize certain vocal commands enunciated by a user and detected by a modified sensor (SEN), e.g., "stop", "go", "reverse", "faster" and "slower". In this fashion, a user who is not sufficiently close to a rach according to the present invention to operate control 37, 37' or 37" but is sufficiently close to recognize where a desired object approaches the upper fanout region 11 can vocally command the rack to halt loop rotation.

Both loops 310 and 320 are simultaneously rotated in rack 300 by a single motor 28 that can be identical to motor 28 as shown in FIG. 3 or 9. The various drive sprockets and pulley assembly configuration shown in FIGS. 3 and 9 are preferably also used for the dual loop configuration of FIGS. 15A and 15B. One difference is that the length of driven shaft 40 is increased to drive two rather than one continuous belt of linked-together holders 32, and there will be a pair of driven sprockets 22 and 24 at the lower region of belt 310 and belt 320, and there will be a pair of driven sprockets 36 and 38 at the upper fanout regions 11 of belt 310 and belt 320. In rack 10, motor 28 was disposed in a lower portion of the rack housing. However in rack 300, it is preferred that the single motor 28 be disposed adjacent the upper portion of the rack housing. Mounting motor 28 in an upper portion of rack 300 seems to reduce sag or droop in loops 310, 320 formed by interlocking holders 32. As a result of reduced sag, there is less likelihood that the loops will disengage themselves from driven sprockets 36 and 38, for example due to the weight of holders 32, including CD jewel cases 18, and CDs 15 within the jewel cases.

Motor 28 preferably is about 25 mm diameter and can be driven by 12 VDC, provided by batteries B1 disposed in the central base portion 350, where their weight contributes to a lower center of gravity for the overall rack. Six 1.5 VDC D Cells may be used to power rack 300, or, an external power source can provide operating potential via an input power jack J1. In the preferred embodiment, control 37 engages a spring loaded rotary switch S1. In a neutral position, S1 disconnects operating power from motor 28. When S1 s twisted one position clockwise, loops 310, 320 begin to rotate in a first direction, and when S1 is twisted with control 37 further clockwise, rotation of the loops slows. When control 37 twists S1 one position counterclockwise, loops 310, 320 rotate in the opposite direction, and when further twisted counter-clockwise, belt rotations in that direction slows. When the user releases control 37, S1 is spring-biased to an off position, and all belt rotation ceases, and if unit 410 is present, LEDs 420 will cease illumination a brief time after rotation ceases. If desired, foot-operable controls such as 37', 27" may be used in addition to or instead of control 37, to direct rotation and rotation speed of the loops in the rack 300. Motor speed and direction is preferably user-controlled by controlling polarity of voltage from source B1 coupled to the motor, and magnitude of such voltage.

Thus, control 37 (or foot control(s) 37', 37") governs operations of dual-loop rack 300 in a similar fashion as operation of single-loop rack 10 (as shown in FIG. 1). As a jewel box 18 containing a desired CD 15 is moved on belt 310 or 320 to the fanpout position 11 at the upper portion of rack 300, the user will halt rotation of motor 28 to halt belt rotation. The user may now remove the desired jewel cases(s) from rack 300.

FIG. 15B is a partial skeletal view of rack 300, showing only two of the perhaps two hundred linkable holders 32 normally found on rack 300. FIG. 15 depicts internal struts 500 that are used to secure vertical members 330, 340, and 350 to each other. As noted, during manufacture and perhaps on rare occasion thereafter it may be necessary to adjust the tension in loops 310, 320. Those skilled in the art will recognize that the use of shims or bearing blocks such as 510 are convenient mechanism for accomplishing such adjustments. In the preferred embodiment, the left and right distal ends of the lengthened rotatable shaft 40 are retained in concave projecting regions 520 of left and right bearing blocks units 510. The concave region 510 of each bearing block unit 510 captures the distal end of shaft 40, and may be moved vertically up or down to increase or to decrease tension in the loops formed by the interconnected holders 32. An outwardly facing projection 530 on each bearing block unit fits through a slot 540 formed in an out vertical support member 330, 340. Thus, vertical up or down movement of projection 530 increases or decreases belt tension. Once the desired tension is achieved, the desired vertical position of project 530 is secured, for example by screws 550 that anchor bearing block 510 to an adjacent outer vertical support member 330 or 340. As noted, however, many other techniques are known in the art for adjusting, if needed, tension in a belt, and what is described above is exemplary.

As was described with respect to FIGS. 14B–14D, a preferred embodiment of holder 150 or 150' is sized to hold at least two objects 18 in a side-by-side configuration. If desired the width or holder 150, 150' could be increased to retain three or more objects, in which case preferably two rather than one partition sidewall 180 would be used. The partition sidewall preferably is joined, at least in part, to portions of the spaced-apart upper and lower walls 160 and 170 of holder 150, 150'. Thus, a holder 150, 150' able to retain three CD jewel boxes 18 preferably would have two partition sidewalls 180 disposed to separate otherwise adjacent sides of the jewel cases. Similarly, just as the holder configuration of FIG. 13 can be replicated twice to yield holder 32" such as depicted in FIG. 14F, the holder configuration of FIG. 13 could also be replicated three or more times to retain three or more CDs in a side-by-side configuration. If desired, forming hub projections 54 on each surface of the holder would permit a single holder to hold six CDs (or more, it more side-by-side holder replications are provided). As with the various other holder embodiments described herein, preferably such holder would be unitarily formed asz a single piece of material, preferably by injection molding ABS type plastic.

FIG. 15C depicts a preferred rack embodiment 300' that uses a single motor 28 to rotate loops 310, 320, wherein both loops are formed from a plurality of dual-object holders 150, 150', such as depicted in FIGS. 14B–14D. the various drive sprockets, gears, pulley and drive systems described with respects to FIGS. 1–3. 6A, 6B, 7, 8, 9, 15A and 15B are also applicable to rack 300'. Motor 28, which preferably is mounted in an upper region of the rack to reduce the effects of sag on the loops formed by holders 15o, 150' and their contents, causes rotation of upper shaft 40 in response to user operation of control 37, and/or 37', or remote unit 460. Preferably rack 300' can be provided with unit 410, which can illuminate the upper fanout region 11 of the rack, and in cooperation with electronics 390 can provide scanning barcodes 450 on objects 18 retains by the dual-object holders 150, 150'. As described earlier, electronics 390 and sensor SENS can also be used to implement voice command operation of loop movement, e.g., direction, speed, halting. Preferably rack 300' is provided with detachable side base member 380 to permit shipping the rack in a smaller carton that would be possible if the actual rack based dimensions approximated the effective footprint of rack 300'.

Although the various preferred embodiments of a rack depicts jewel cases 18 containing CD 15, as indicated in the upper most portion of FIG. 15C, an object 18 can retain other than a CD. Thus, object 18 may contain, for example, a baseball trading 15' or other memorabilia. Understandably a rack intended to retain baseball trading cards could utilize holders 32, 150, 150' that preferably were scaled down in size to retain objects smaller than CD jewel boxes.

Figures 16A, 16B, 16C, 16D:
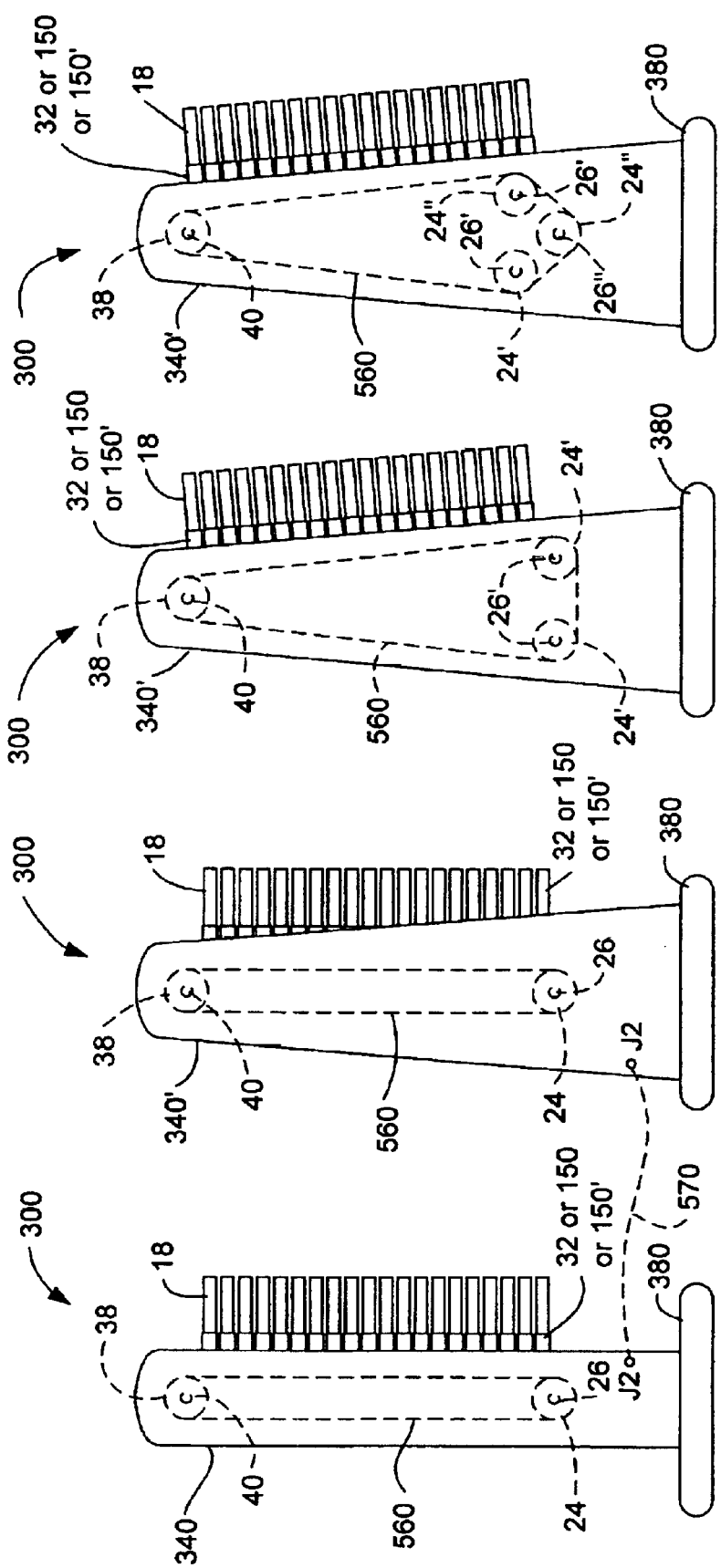
FIG. 16A is a schematic side view depicting a rack with two rotation axes, according to the present invention.
FIG. 16B is a schematic side view depicting a rack with two rotation axes and vertical support members that are enlarged adjacent the base member, according to the present invention.
FIG. 16C is a schematic side view depicting a rack with three rotation axes and vertical support members that are enlarged adjacent the base member, according to the present invention.
FIG. 16D is a schematic side view depicting a rack with four rotation axes and vertical support members that are enlarged adjacent the base member, according to the present invention.

Referring to the schematic diagram of FIG. 16A, while the preferred embodiments of a single or a multi-loop rack provide a single rotation axis 40 near the loop upper fanout region, and a single rotation axis 26 near the loop lower fanout region, other configurations are possible. In FIG. 16A (and indeed in FIGS. 16B–16D), sprockets 38 and 24 (or 24') are depicted as circles fore ease of illustration. In these figures, 560 denotes a simplified locus of the loop path, the loop being formed from interconnected holders such as 32 or 150 or 150'. Note that the preferably vertical spaced-apart distance between axes 40 and 26 in FIG. 16A is approximately half the length of the loop formed by the inter-connected holders. As noted elsewhere herein, the mating between male holder interconnect mechanisms 17 and female holder interconnect mechanisms 21 is sufficiently flexible to enable the resultant loop to change direction about sprockets 38 and 24 in the upper and lower fanout regions.

The configuration of 16B is similar to that of FIG. 16A except that the vertical side member 340' are broadened at the base to present a somewhat elongated triangular configuration, as contrasted with the somewhat rectangular configuration shown in FIG. 16A (and indeed in FIGS. 1, 9, 10, 15A–15C).

If desired, a plurality of single or multi-loop racks, according to the present invention, may be daisy-chained such that user operation of one rack can command rotation of one or more additional racks. As shown in FIGS. 16A and 16B, the communication link 570 between the racks can be a physical cable, for example connecting communication jacks J2 on each rack, or the communication link 570 can be wireless, for example Bluetooth-compatible RF, detected and signal processed by electronics 390 in each rack. In a daisy-chained environment, the user could control a master rack with control 37, 37', 37", or control remotely using device 460. Each rack preferably would include a scan unit 410 and while all racks would rotate their reprehensive loop(s) together, as soon as a scanned object was detected by any rack, loop rotation would cease for that rack. Alternately, as soon as a user observed a desired object approaching the upper fanout region of a rack, cessation of loop rotation for that rack could be user-commanded. If desired, daisy-chaining could be such that when on rack ceases loop rotation, all racks cease loop rotation.

Although the preferred embodiments have been described with regard to producing loop rotation by means of an electric motor, it will be appreciated that a loop formed by inter-connected single object-retaining or multiple-object retaining holders could instead be manually rotated. For example, a crankshaft-life member could be attached to upper rotation shaft 40 to directly rotate the shaft manually. Such crankshaft could project out from the left or right upper portion of a vertical support member. In another embodiment, a continuous loop formed from inter-connected holders according to the present invention might be disposed about two rotation shafts projecting out from a wall or display board. Aside from upper and lower rotation sprockets, not other structure would be required, and the user could simply manually rotate the loop. Such embodiment might be useful as part of a store display of merchandise retained by single or multi-object holders.

Modifications and variations may be made to the disclosed embodiments without departing from the subject and spirit of the invention as defined by the following claims.

What is claimed is:

1. A rack that retains and rotates objects, the rack comprising:
   a loop formed from a plurality of inter-connected holders, each holder comprising:
   first and second walls retained a spaced-apart distance from each other by a base wherein the walls are sufficient to admit and frictionally retain at least a portion of at least one object to be retained by said holder while exposing at least part of a retained said object for user selection and removal from said holder;
   a male holder-engaging mechanism extending from the base and adjacent to a slot wherein the slot extends through the base; and
   a female holder-engaging mechanism;
   wherein said male holder-engaging mechanism is disposed to flexibly matingly interlock with a female holder-engaging mechanism on a second holder, and said female holder-engaging mechanism is disposed to flexibly matingly interlock with the male holder-engaging mechanism on a third holder in forming said loop;
   a first rotation shaft; and
   a second rotation shall disposed parallel to and spaced-apart from said first rotation shaft a distance approximating half a length of said loop;
   wherein said loop is rotatable about said first rotation shaft and said second rotation shaft.

2. The rack of claim 1, wherein each of said holder is unitarily formed from a single piece of material.

3. The rack of claim 1, wherein each of said holders is formed as a one-piece holder from injection molded ABS plastic.

4. The rack of claim 1, wherein each said holder can retain one of said objects.

5. The rack of claim 1, wherein each said holder can retain at least two of said objects.

6. The rack of claim 1, further including:
   a motor, mechanically rotatably coupled to said first rotation shaft to rotate said belt; and
   a user-operable control, coupled to said motor, said control including at least one the following: (a) a switch governing motor rotational speed of said loop, (b) a switch governing direction of rotation of said loop, (c) a remotely controllable unit governing motor rotational speed of said loop, (d) a remotely controllable unit governing direction of rotation of said loop, and (e) a mechanism able to read scancode on a desired said object and to halt rotation of said loop upon recognition of a user-selected said scancode.

7. The rack of claim 1, further including:
   a first vertical support member and a second vertical support member, each said member having a height exceeding said distance between said first rotation shaft and said second rotation shaft;
   a base member, affixed to a lower portion of said first and said second vertical support member; and
   at least one user-removable base side member sized to increase effective area of said base member when attached thereto.

8. The rack of claim 7, further including:
   a light emitting unit, coupleable to an upper region of said first vertical support member, to illuminate some said objects as said loop rotates.

9. The rack of claim 7, further including:
   a scancode reader, coupleable to a region of said vertical support member, to read scancode on at least one of said objects, said scancode identifying an object; and
   electronics coupled to said scancode reader to halt loop rotation upon recognition by said scancode reader of a scancode desired by a user.

10. The rack of claim 7, wherein each said vertical support member has one of the following characteristics: (a) in side view said support member is wider at a base region than at an upper region, and (b) in side view said support member has substantially equal width at a base region and at an upper region.

11. A rack that retains and rotates objects, the rack comprising:
    a loop formed solely from a plurality of inter-connected holders, each holder comprising means for frictionally retaining at least a portion of at least one object to be retained by said holder while exposing at least part of a retained said object for user selection and removal from said holder, and further comprising means for flexibly matingly inter-connecting with another said holder, wherein said loop is formed from flexibly matingly inter-connecting said holders;
    means for rotating said loop at a rotation speed and direction selectable by a user;
    a housing containing said loop and said means for rotating said loop, said housing including a base having at least one detachable side base member;
    wherein the means for frictionally retaining and the means for flexibly matingly inter-connecting extend from a base; and
    wherein the means for flexibly matingly inter-connecting is adjacent to a slot wherein the slot extends through the base.

12. The rack of claim 11, wherein each of said holders is from injection molded ABS plastic.

13. The rack of claim 11, further including a unit attachable to said rack, said unit including at least one of the following: (a) a light source to illuminate at least a portion of said loop, and (b) a scanner to scan barcode carried by objects retained by holders comprising said loop in said rack.

14. The rack of claim 11, wherein said means for rotating enables at least one type of user-control wherein user-control includes at least one of the following: a) a switch governing motor rotational speed of said loop, (b) a switch governing direction of rotation of said loop, (c) a remotely controllable unit governing motor rotational speed of said loop, (d) a remotely controllable unit governing direction of rotation of said loop, and (e) a mechanism able to read scancode on a desired said object and to halt rotation of said loop upon recognition of a user-selected said scancode.

15. A rotatable loop of displayable objects, the loop formed by matingly interlocking adjacent holders, wherein each holder can retain at least one of said objects, the loop comprising:
    first and second walls retained a spaced-apart distance from each other by a base wherein the walls are sufficient to admit and frictionally retain at least a portion of at least one object to be retained by said holder;
    a first holder-engaging mechanism extending from the base and adjacent to a slot wherein the slot extends through the base;
    a second holder-engaging mechanism;
    a first holder-engaging mechanism disposed to matingly interlock with the second mechanism an a second said holder when desired to form said loop; and said second holder-engaging mechanism disposed to matingly interlock with the first holder-engaging mechanism on a third said holder when desired to form said loop.

16. The loop of claim 15, wherein each of said holders is unitarily fabricated as a single piece.

* * * * *